United States Patent
Fukuhara et al.

(10) Patent No.: US 8,249,375 B2
(45) Date of Patent: Aug. 21, 2012

(54) INFORMATION PROCESSING APPARATUS AND METHOD

(75) Inventors: Takahiro Fukuhara, Kanagawa (JP); Katsutoshi Ando, Kanagawa (JP); Yuuki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 12/617,223

(22) Filed: Nov. 12, 2009

(65) Prior Publication Data
US 2010/0142827 A1    Jun. 10, 2010

(30) Foreign Application Priority Data
Dec. 5, 2008    (JP) .................................. 2008-310731

(51) Int. Cl.
*G06K 9/36* (2006.01)
*G06K 9/46* (2006.01)

(52) U.S. Cl. ..................................................... 382/240
(58) Field of Classification Search .................. None
See application file for complete search history.

(56) References Cited

U.S. PATENT DOCUMENTS

| | | | | |
|---|---|---|---|---|
| 5,384,869 | A * | 1/1995 | Wilkinson et al. | 382/240 |
| 6,125,143 | A * | 9/2000 | Suzuki et al. | 375/240.11 |
| 6,148,115 | A * | 11/2000 | Mackinnon et al. | 382/266 |
| 6,876,772 | B2 * | 4/2005 | Fukuhara et al. | 382/240 |
| 7,127,111 | B2 * | 10/2006 | Fukuhara et al. | 382/232 |
| 7,142,722 | B2 * | 11/2006 | Fukuhara et al. | 382/240 |
| 7,463,780 | B2 * | 12/2008 | Fukuhara et al. | 382/240 |
| 7,907,785 | B2 * | 3/2011 | Fukuhara et al. | 382/240 |
| 7,925,102 | B2 * | 4/2011 | Fukuhara et al. | 382/232 |
| 7,936,376 | B2 * | 5/2011 | Fukuhara | 348/222.1 |
| 2007/0013845 | A1 | 1/2007 | Nagata et al. | |
| 2007/0269122 | A1 | 11/2007 | Fukuhara et al. | |
| 2007/0286510 | A1 | 12/2007 | Fukuhara | |
| 2008/0013846 | A1 | 1/2008 | Fukuhara et al. | |
| 2008/0181300 | A1 * | 7/2008 | Hosaka et al. | 375/240.03 |
| 2008/0181522 | A1 * | 7/2008 | Hosaka et al. | 382/251 |
| 2008/0284788 | A1 | 11/2008 | Ando et al. | |
| 2008/0285865 | A1 | 11/2008 | Fukuhara et al. | |
| 2008/0285869 | A1 | 11/2008 | Fukuhara et al. | |
| 2008/0285872 | A1 | 11/2008 | Fukuhara et al. | |

(Continued)

FOREIGN PATENT DOCUMENTS
JP    2002-91943    3/2002

(Continued)

OTHER PUBLICATIONS
Office Action issued Oct. 5, 2010, in Japanese Patent Application No. 2008-310731.

(Continued)

*Primary Examiner* — Yuzhen Ge
(74) *Attorney, Agent, or Firm* — Oblon, Spivak, McClelland, Maier & Neustadt, L.L.P.

(57) ABSTRACT

An information processing apparatus includes a device for performing horizontal analysis filtering, a device for performing vertical analysis filtering, and a device for horizontal control. The information processing apparatus also includes a first control device. This device allows the device for horizontal control to repetitively perform the horizontal control until the horizontal analysis filtering is performed on all of columns of a processing object line. The information processing apparatus further includes a device for vertical control and a second control device that allows the device for vertical control to repetitively perform the vertical control until the vertical analysis filtering is performed on all of lines.

13 Claims, 20 Drawing Sheets

U.S. PATENT DOCUMENTS

| | | | |
|---|---|---|---|
| 2008/0285874 A1 | 11/2008 | Fukuhara et al. | |
| 2008/0298471 A1 | 12/2008 | Fukuhara et al. | |
| 2008/0304574 A1 | 12/2008 | Fukuhara et al. | |
| 2009/0060371 A1* | 3/2009 | Niedermeier et al. | 382/263 |
| 2009/0092326 A1* | 4/2009 | Fukuhara et al. | 382/233 |
| 2009/0102686 A1 | 4/2009 | Fukuhara et al. | |

FOREIGN PATENT DOCUMENTS

| | | |
|---|---|---|
| JP | 2008-22403 | 1/2008 |
| JP | 2008-288841 | 11/2008 |

OTHER PUBLICATIONS

Wim Sweldens, "The Lifting Scheme: A Custom-Design Construction of Biorthogonal Wavelets", Applied and Computational Harmonic Analysis, vol. 3, No. 2, 1996, pp. 186-200.

Christos Chrysafis, et al. "Line-Based, Reduced Memory, Wavelet Image Compression", IEEE Transactions on Image Processing, vol. 9, No. 3, Mar. 2000, pp. 378-389.

* cited by examiner

INFORMATION PROCESSING APPARATUS AND METHOD

BACKGROUND OF THE INVENTION

1. Field of the Invention

The present invention relates to an apparatus and a method for information processing. Specifically, the present invention relates an information processing apparatus and a method of information processing to be used in such an apparatus, where the apparatus and the method are capable of reducing the memory usage of a wavelet transformation process in the apparatus.

2. Description of the Related Art

Typical image compression systems, which have been used in the art, include JPEG (Joint Photographic Experts Group) and JPEG 2000 standardized by ISO (International Standard Organization).

In recent years, extensive studies have been conducted for a system in which a combination of filters, high-pass filters and low-pass filters, called as a filter bank is employed to divide an image into a plurality of bands and encoding is then performed for every band. In particular, the wavelet encoding, which is free of a matter of block distortion at high compression occurred in DCT (Discrete Cosine Transform), is thought to be promising as a new technology as an alternative to DCT.

JPEG 2000 realizes a great improvement in encoding efficiency compared with JPEG because of employing a combination of the wavelet transform and a high-efficient entropy algorithm (bit modeling in units of bit plane and arithmetic encoding).

The wavelet transform basically includes a process of obtaining input image data and then filtering the image data in both the horizontal direction and the vertical direction to cause hierarchical division of low-path components. In this case, reading/writing operation of data may be performed at high frequency, including reading of image data, writing of a frequency coefficient generated as a result of filtering into memory, re-reading of frequency coefficient, and so on (see, for example, Japanese Published Patent Application No. 2008-022403).

SUMMARY OF THE INVENTION

However, processing of a large amount of data is avoidable in the case of an image signal, so that the amount of memory will become insufficient at the time of wavelet transform. There, a method of executing the wavelet transform using a small memory size has been considered. For example, Part-1 of JPEG 2000 employs a system that performs a wavelet transform process based on a tile of 128×128 pixels. If the wavelet transform is performed within this limited tile size, the memory capacity can be saved very much.

However, in this method, the boundary between the adjacent tiles is discontinuous. Thus, an increase in compression ratio in image compression using the wavelet transform may make such a boundary noticeable, resulting in a visual defect. In order to prevent such a disadvantage, SSOWT (Special Segmented Overlapped Wavelet Transform) has been proposed. The SSOWT is a method in which a portion protruded from the boundary of the adjacent tiles is referred from the adjacent block by boundary filling.

However, such a method may cause an increase in necessary memory size in response to an increase in number of dividing components in the wavelet transform.

The present invention has been made in view of the above circumstances. It is desirable to perform wavelet transform of an image signal using a small amount of memory. In addition, it is also desirable to generate the same wavelet transform coefficients as those obtained by the wavelet transform of the whole screen.

An embodiment of the present invention is an information processing apparatus that performs wavelet transform on an image signal and includes the following structural components:

First, the information processing apparatus includes a device configured to perform horizontal analysis filtering. Here, the horizontal analysis filtering is performed to divide frequency components of the image signal into a low-pass component and a high-pass component in the horizontal direction. The information processing apparatus also includes a device configured to perform vertical analysis filtering. Here, the vertical analysis filtering is performed to divide each of the low-pass component and the high-pass component, which has been divided by the horizontal analysis filtering in the device configured to perform horizontal analysis filtering, into a low-pass component and a high-pass component in the vertical direction. The information processing apparatus further includes a device configured to perform horizontal control. In this device, in an unsteady state where a first arithmetic coefficient which is a coefficient available for horizontal analysis filtering is not present, the horizontal analysis filtering is performed on the frequency components of a first information volume.

In addition, in a steady state where the first arithmetic coefficient is present, the horizontal analysis filtering is performed on the frequency components of a second information volume using the first arithmetic coefficient. The information processing apparatus further includes a first control device configured to allow the device configured to perform horizontal control to repetitively perform the horizontal control until the horizontal analysis filtering is performed on all of columns of a processing object line. The information processing apparatus further includes a device configured to perform vertical control. In this device, in an unsteady state where a second arithmetic coefficient which is a coefficient available for vertical analysis filtering is not present, the vertical analysis filtering is performed on the low-pass component and the high-pass component of a third information volume. In addition, in a steady state where the second arithmetic coefficient is present, the vertical analysis filtering is performed on the low-pass component and the high-pass component on a fourth information volume using the second arithmetic coefficient. The information processing apparatus further includes a second control device configured to allow the device configured to perform vertical control to repetitively perform the vertical control until the vertical analysis filtering is performed on all of lines.

When the device configured to perform horizontal control is in the unsteady state, the device may perform symmetrical extension of a sample on a column which is the second from the left of an image to add a sample which is the leftmost of the image.

When the device configured to perform vertical control is in the unsteady state, the device may perform symmetrical extension of a sample on a line which is the second from the top of the image to add a sample which is the topmost of the image.

The device configured to perform horizontal analysis filtering may perform the horizontal analysis filtering by lifting calculation using a predetermined filter.

The device configured to perform horizontal analysis filtering latches some of coefficients obtained by the lifting calculation as the first arithmetic coefficient.

The device configured to perform horizontal control may determine whether it is in the unsteady state or the steady stage depending on whether the first arithmetic coefficient is latched and then perform the horizontal control.

The device configured to perform vertical analysis filtering may perform the vertical analysis filtering by lifting calculation using a predetermined filter.

The information processing apparatus may further include a holding device configured to hold some of coefficients obtained by the lifting calculation in the vertical analysis filtering. Here, the device configured to perform vertical analysis filtering may allow the holding device to hold some of the coefficients obtained by the lifting calculation as second arithmetic coefficient. In addition, the device configured to perform vertical control may determine whether it is in the unsteady state or the steady stage depending on whether the second arithmetic coefficient is held in the holding device and performs the vertical control.

The first information volume may be five columns and the second information volume may be two columns.

The third information volume may be five lines and the fourth information volume may be two lines.

The first information volume may be three columns and the second information volume may be two columns.

The third information volume may be three lines and the fourth information volume may be two lines.

An embodiment of the present invention is an information processing method to be applied to an information processing apparatus that performs wavelet transform on an image signal. In this method, such an information processing apparatus includes a device configured to perform horizontal analysis filtering. Here, horizontal analysis filtering is performed to divide frequency components of the image signal into a low-pass component and a high-pass component in the horizontal direction. The information processing apparatus also includes a device configured to perform vertical analysis filtering. Here, vertical analysis filtering is performed to divide each of the low-pass component and the high-pass component divided by the horizontal analysis filtering in the device configured to perform horizontal analysis filtering into a low-pass component and a high-pass component in the vertical direction. The method includes the step of allowing the device configured to perform horizontal analysis filtering to perform horizontal analysis filtering on the frequency components of a first information volume when such a device is in an unsteady state where a first arithmetic coefficient which is a coefficient available for horizontal analysis filtering is not present. Alternatively, in a steady state where the first arithmetic coefficient is present, the above step allows the device configured to perform horizontal analysis filtering to perform the horizontal analysis filtering on the frequency components of a second information volume using the first arithmetic coefficient. The method also includes the step of allowing device configured to perform first control to allow the device configured to perform horizontal control to repetitively perform the horizontal control until the horizontal analysis filtering is performed on all of columns of a processing object line. The method further includes the step of, when the device configured to perform vertical control is in an unsteady state where a second arithmetic coefficient which is a coefficient available for vertical analysis filtering is not present, the vertical analysis filtering is performed on the low-pass component and the high-pass component of a third information volume. Alternatively, when the device configured to perform vertical control is in a steady state where the second arithmetic coefficient is present, the vertical analysis filtering is performed on the low-pass component and the high-pass component on a fourth information volume using the second arithmetic coefficient. The method further includes the step of allowing the device configured to perform second control to allow the device configured to perform vertical control to repetitively perform the vertical control until the vertical analysis filtering is performed on all of lines.

In this embodiment, in an unsteady state where a first arithmetic coefficient which is a coefficient available for horizontal analysis filtering is not present, the horizontal analysis filtering is performed on the frequency components of a first information volume. Alternatively, in a steady state where the first arithmetic coefficient is present, the horizontal analysis filtering is performed on the frequency components of a second information volume using the first arithmetic coefficient and the horizontal analysis filtering is then repeatedly performed on all of columns of a processing object line. In an unsteady state where a second arithmetic coefficient which is a coefficient available for vertical analysis filtering is not present, the vertical analysis filtering is performed on the low-pass component and the high-pass component of a third information volume. When the device configured to perform vertical control is in a steady state where the second arithmetic coefficient is present, the vertical analysis filtering is performed on the low-pass component and the high-pass component on a fourth information volume using the second arithmetic coefficient and the vertical analysis filtering is then repeatedly performed on all the lines.

According to any embodiment of the present invention, wavelet transform can be performed. In particular, a memory capacity for a wavelet transform process can be reduced.

DESCRIPTION OF THE PREFERRED EMBODIMENTS

Hereinafter, the best mode for carrying out the present invention will be described by way of embodiments thereof. The description will be given in the following order:

1. First embodiment (wavelet-transform process: example in which control is performed more carefully);
2. Second embodiment (5×3 filter is applied); and
3. Third embodiment (Application example: example of application to encoding apparatus).

1. First Embodiment

[Exemplary Configuration of Wavelet Transformer]

Figure 1:
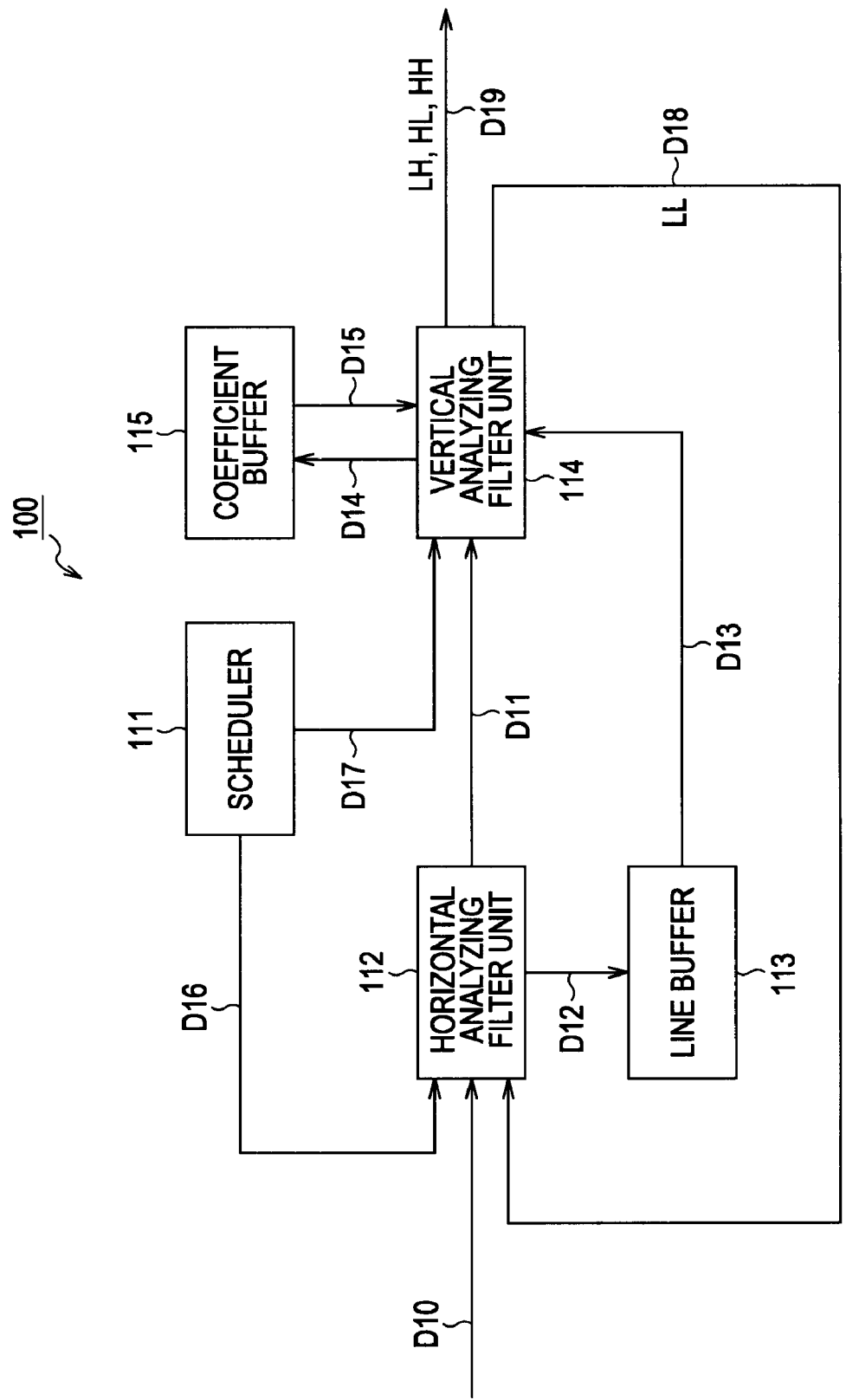
FIG. 1 is a block diagram illustrating an exemplary main configuration of a wavelet transformer according to an embodiment of the present invention.

FIG. 1 is a block diagram illustrating an exemplary configuration of a wavelet transformer according to an embodiment of the present invention. In FIG. 1, the wavelet transformer 100 is configured to perform a wavelet transform process where an analysis filtering process for separating input data into low-pass components and high-pass components is performed on an input image signal in both the horizontal direction and the vertical direction of a screen.

In other words, the wavelet transform process divides the input data into four components (sub-bands). A first one of these sub-bands is composed of a low-pass component in the horizontal direction and a low-pass component in the vertical direction (hereinafter, such a sub-band will be also referred to as an LL component). A second one of these sub-bands is composed of a high-pass component in the horizontal direction and a low-pass component in the vertical direction (hereinafter, such a sub-band will be also referred to as a HL component). A third one of these sub-bands is composed of a low-pass component in the horizontal direction and a high-pass component in the vertical direction (hereinafter, such a sub-band will be also referred to as an LH component). A fourth one of these sub-bands is composed of a high-pass component in the horizontal direction and a high-pass component in the vertical direction (hereinafter, also referred to as an HH component).

The wavelet transformer 100 recursively repeats a predetermined number of times such a wavelet transform process on the low-pass components in both the horizontal and vertical directions (LL component) obtained by the filtering process.

As shown in FIG. 1, the wavelet transformer 100 includes a scheduler 111, a horizontal analysis filter unit 112, a line buffer 113, a vertical analysis filter unit 114, and a coefficient buffer 115.

The scheduler 111 mainly performs timing control of both the horizontal analysis filter unit 112 and the vertical analysis filter unit 114. This control will be described later.

The horizontal analysis filter unit 112 is controlled by the scheduler 111 (D16), while performing horizontal analysis filtering on an image signal (D10) entered from the outside or an LL component (D18) supplied from the vertical analysis filter unit 114.

The analysis filtering is performed using lifting calculation and the details thereof will be described later. Therefore, analysis filtering in the horizontal direction (horizontal analysis filtering) is performed on samples among coefficients of one line, corresponding to a predetermined number of columns.

The image signals (D10) of one picture are entered every line of an image in top-to-bottom order. The image signals (D10) of each line are entered every sample (every column) in left-to-right order. These orders are also applied to the case of the LL component (D18). In order words, the order of entries of data corresponds to the order of processing.

Therefore, whenever the horizontal analysis filter unit 112 obtains the data of samples which can be subjected to analysis filtering (upon obtaining the data), horizontal analysis filtering is executed on the data.

Figure 2:
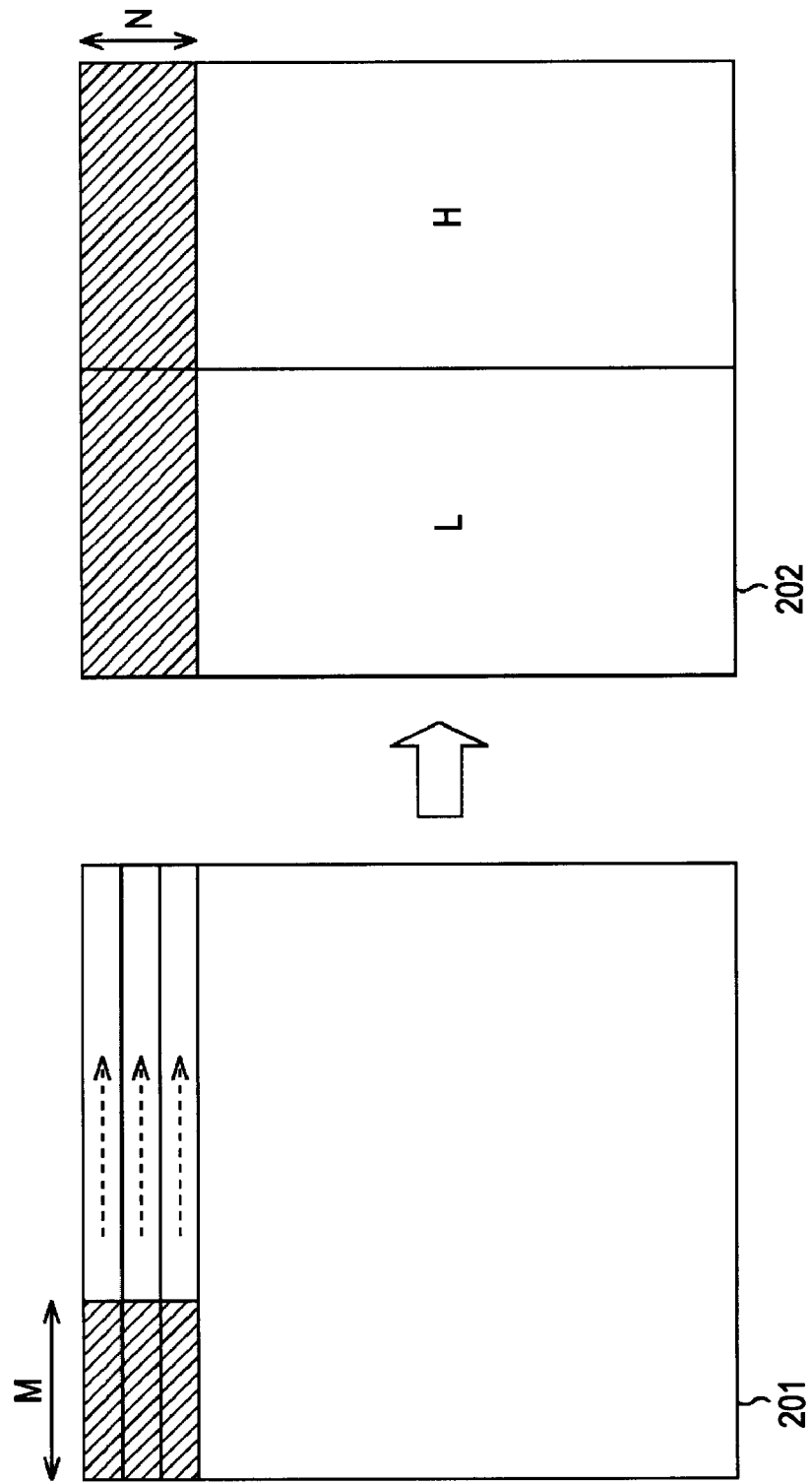
FIG. 2 is a schematic diagram illustrating the configuration of analysis filing.

When the horizontal analysis filtering is performed in this way, for example, base-band image data 201 represented on the left panel of FIG. 2 is divided into a low-pass component (L) and a high-pass component (H) as represented on the right panel of FIG. 2 (the result of the horizontal analysis filtering process 202). The horizontal analysis filtering is performed on each line.

The horizontal analysis filter unit 112 supplies coefficients (D12) of the results of the analysis filtering to the vertical analysis filter unit 114 through the line buffer 113. The line buffer 113 holds temporarily the coefficients (D12) of the results of the analysis filtering and then supplies the coefficients to the vertical analysis filter unit 114 (D13). The line buffer 113 has a storage capacity enough to hold the coefficients as many as at least the number of lines for the analysis filtering in the vertical direction.

The vertical analysis filter unit 114 is controlled by the scheduler 111 (D17) and performs analysis filtering in the vertical direction (vertical analysis filtering) on the results of horizontal analysis filtering. The analysis filtering in the vertical direction is also performed using lifting calculation.

Therefore, the vertical analysis filter unit 114 performs vertical analysis filtering on the read-out coefficients while the data (13) of vertical lines for the vertical analysis filtering are read out from the line buffer 113. Upon the data as many as the number of lines for the vertical analysis filtering are held in the line buffer 113, the vertical analysis filter unit 114 reads out the data and the vertical analysis filtering is then performed on the data. For example, whenever the result 202 of the horizontal analysis filtering process is held in the line buffer 113 as represented on the right panel of FIG. 2, the vertical analysis filter unit 114 reads out the data and then performs vertical analysis filtering on the data.

As a result, as shown in the left panel of FIG. 3, the result of the horizontal analysis filtering process can be divided into the wavelet transform coefficients of four components (hereinafter, also referred to as coefficients) (coefficients 203 of division level 1). In other words, the low-pass component in the horizontal direction is divided into an LL component composed of low-pass components in both the horizontal and vertical directions and a LH component composed of a low-pass component in the horizontal direction and a high-pass component in the vertical direction. Furthermore, the high-pass component in the horizontal direction is divided into a HL component composed of a high-pass component in the horizontal direction and a low-pass component in the vertical direction and a LH component composed of high-pass components in both the horizontal and vertical directions.

The vertical analysis filter unit 114 outputs HL components, LH components, and HH components among the obtained results of the analysis filtering until the coefficient of a predetermined division level is obtained (D19). Simultaneously, the vertical analysis filter 114 returns the LL component to the horizontal analysis filter unit 112 (D18) and the LL component is then subjected to the analysis filtering again.

Figure 3:
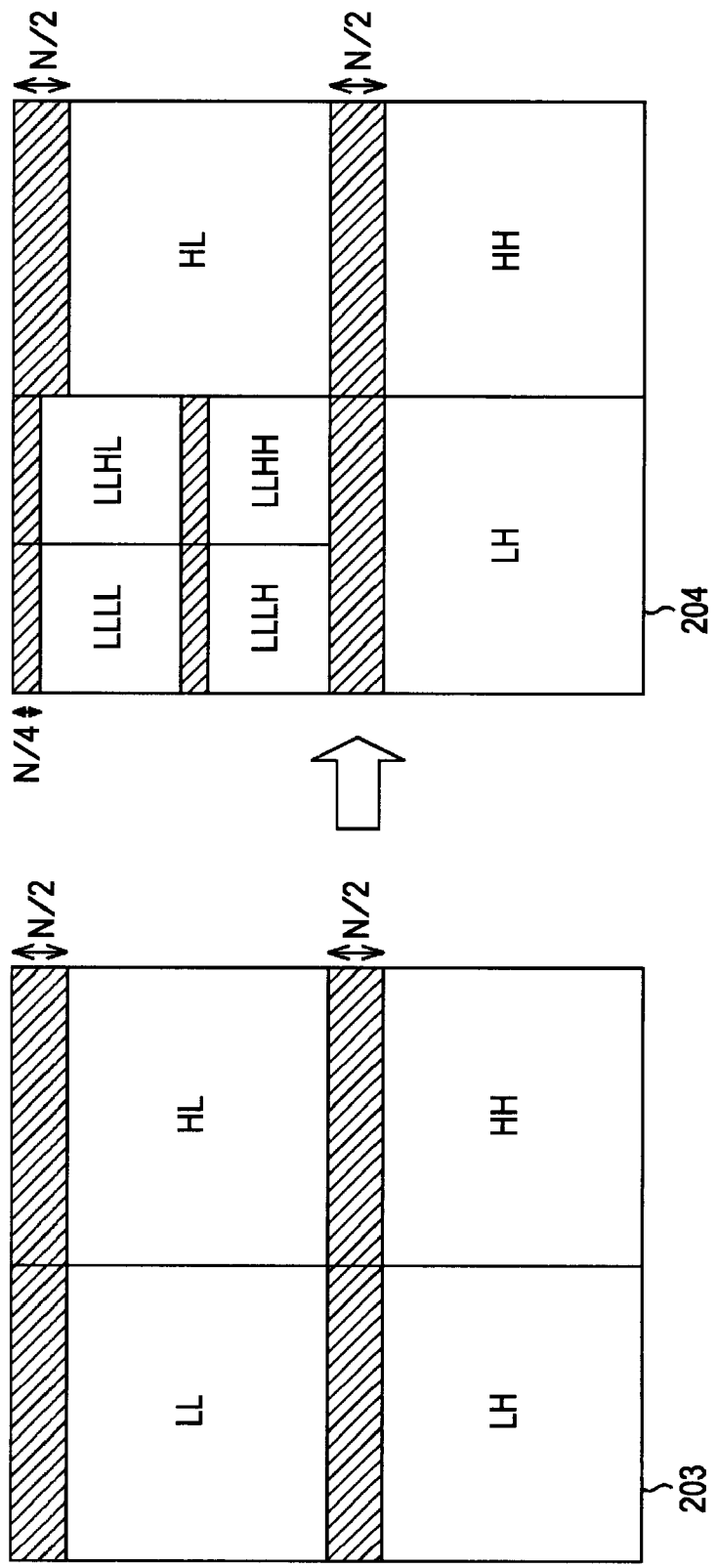
FIG. 3 is a schematic diagram illustrating the configuration of analysis filing, which is subsequence of FIG. 2.

In other words, each of the horizontal analysis filter unit 112 and the vertical analysis filter unit 114 perform the analysis filtering process like the one described above on low-pass components (LL component) in each of the horizontal and vertical directions of the coefficients 203 of division level 1 on the left panel of FIG. 3. As a result, coefficients of division level 2 (LLLL, LLHL, LLLH, and LLHH components) are generated.

Coefficients 204 divided at division level 2 are represented on the right panel of FIG. 3. The coefficients 204 include LLLL, LLHL, LLLH, and LLHH components divided from the LL components of the coefficients 203. In other words, these components are coefficients at division level 2. In this way, the horizontal analysis filter unit 112 and the vertical analysis filter unit 114 repeat their respective analysis filtering processes on LL components composed of low-pass components in both the horizontal and vertical directions recursively to divide an original image 201 into components finally at a desired division level.

Figure 4:
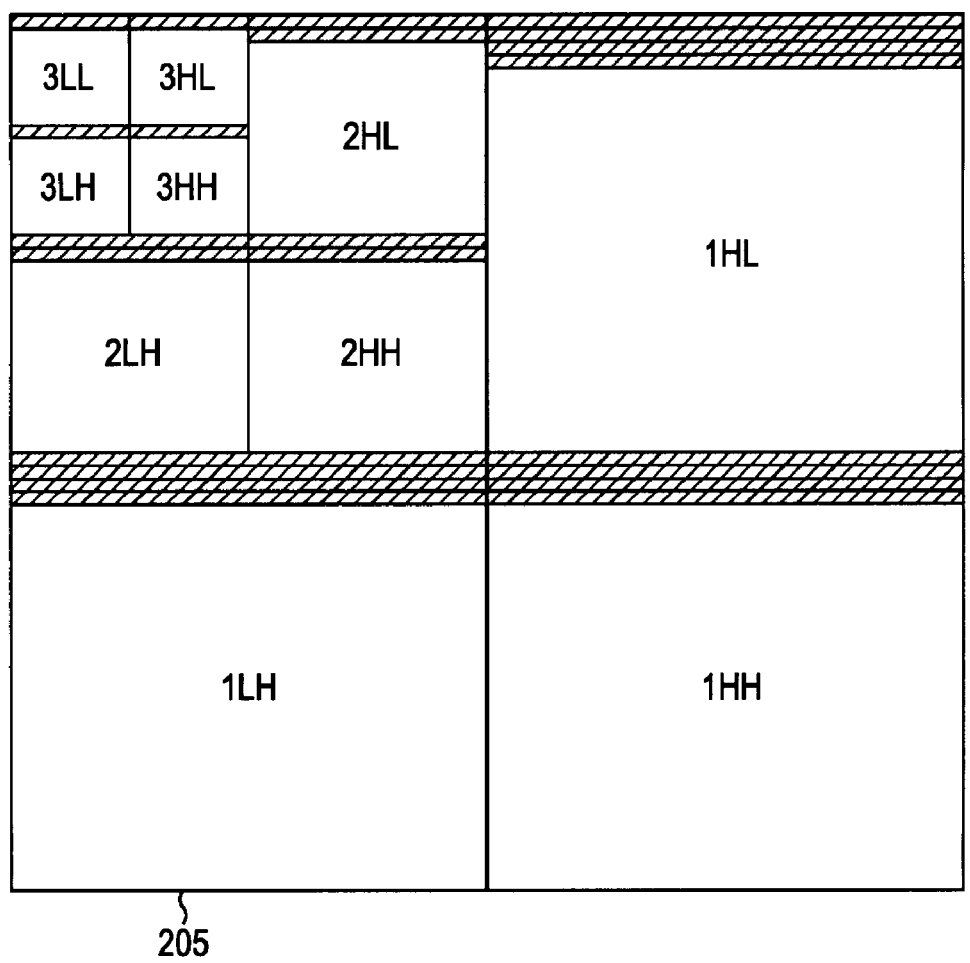
FIG. 4 is a schematic diagram illustrating the configuration of a line block.

FIG. 4 is a diagram illustrating an example of coefficients when dividing to division level 3. In FIG. 4, the coefficients 205 divided to division level 3 include sub-bands of division level 1, 1HL, 1LH, and 1HH components. In addition, the coefficients 205 include sub-bands of division level 2, 2HL, 2LH, and 2HH components. Furthermore, the coefficients 205 include sub-bands of division level 3, 3LL, 3HL, 3LH, and 3HH components.

In the wavelet transform process, whenever it repeats a filtering process (whenever the division level proceeds one level in the hierarchy thereof), the number of lines generated becomes small in proportion to a factor of one divided by two to the n-th power ("n" denotes a positive integer). The number of lines of the base band used in order to generate coefficients of the last division level for one line can be determined depending on the number of times of repeating the filtering process (the hierarchy number of the last division level). Usually, this hierarchy number is defined beforehand.

The image data of the base band used in order to generate coefficients of the last division level for one line (image data for two or more lines) or the coefficients of the respective hierarchical levels are collectively called a line block (or precinct).

In FIG. 4, a slashed portion corresponds to coefficients that constitute one line block. As shown in FIG. 4, the line block includes coefficients for one line of each component at division level 3, or the final division level; coefficients for two lines of each component at division level 2; and coefficients for four lines of each component at division level 1.

In order to reduce the amount of memory to be used, it is preferable to perform a filtering process on every smaller amount of data. Thus, the wavelet transformer 100 performs a wavelet transform process every line block.

When the vertical analysis filter unit 114 performs division of components up to a desired division level, the respective components of the coefficients at the desired division level, LL, HL, LH, and HH components, are output to the outside. In the case of image compression, for example, the coefficients output to the outside are quantized or encoded in the subsequent stages.

The vertical analysis filter unit 114 performs vertical analysis filtering using the coefficient buffer 115. The coefficient buffer 115 holds temporarily the coefficients in the middle of the calculation generated in the vertical analysis filtering (D14) and then provides the vertical analysis filter unit 114 with the coefficients if necessary (D15).

Although the details will be described later, lifting calculation also obtains coefficients in the middle of the calculation in addition to the coefficients (low-pass coefficients or high-pass coefficients) resulted from the calculation. Some of the coefficients in the middle of this calculation and some of the coefficients resulted from the calculation are used for the next lifting calculation. The coefficients to be used for the next lifting calculation (coefficients for calculation) are temporarily held in the coefficient buffer 115.

Since the wavelet transformer 100 is designed as described above, the wavelet transformer 100 can store the results of the filtering in the line buffer 113 while performing horizontal analysis filtering. Furthermore, the wavelet transformer 100 can perform vertical analysis filtering while reading out the results of the above filtering from the line buffer 113.

Therefore, the wavelet transformer 100 can simultaneously perform the analysis filtering in the horizontal direction and the analysis filtering in the vertical direction in parallel. Therefore, the wavelet transformer 100 can perform wavelet transform on a moving image or a high resolution image at high speed.

In addition, the wavelet transformer 100 is provided with the coefficient buffer 115 for vertical analysis filtering. The coefficient buffer 115 is designed to store coefficients necessary to execute the vertical analysis filtering. Thus, the coefficients can be read out and used at the time of the next vertical analysis filtering. Therefore, the coefficient buffer 115 can be realized by internal memory with small capacity and ability of reading/writing information at high speed (high access speed). Thus, an external high-capacity memory device with a slow access speed is not necessary.

[Lifting Calculation]

In the analysis filtering, the most common arithmetic method is a so-called convolution calculation. This convolution calculation is the most basic way to realize digital filters, with convolution multiplication being performed on actual input data on filter tap coefficients. However, with convolution calculation, if the tap length is great, there cases wherein the calculation load increases accordingly.

A technique to handle such a case is wavelet transform lifting, which has been introduced in the paper, W. Swelden, "The lifting scheme: A custom-design construction of Biorthogonal Wavelets", Appl. Computational Harmonic Analysis. Harmon. Anal., Vol. 3, No. 2, pp. 186-200, 1996.

Figure 5:
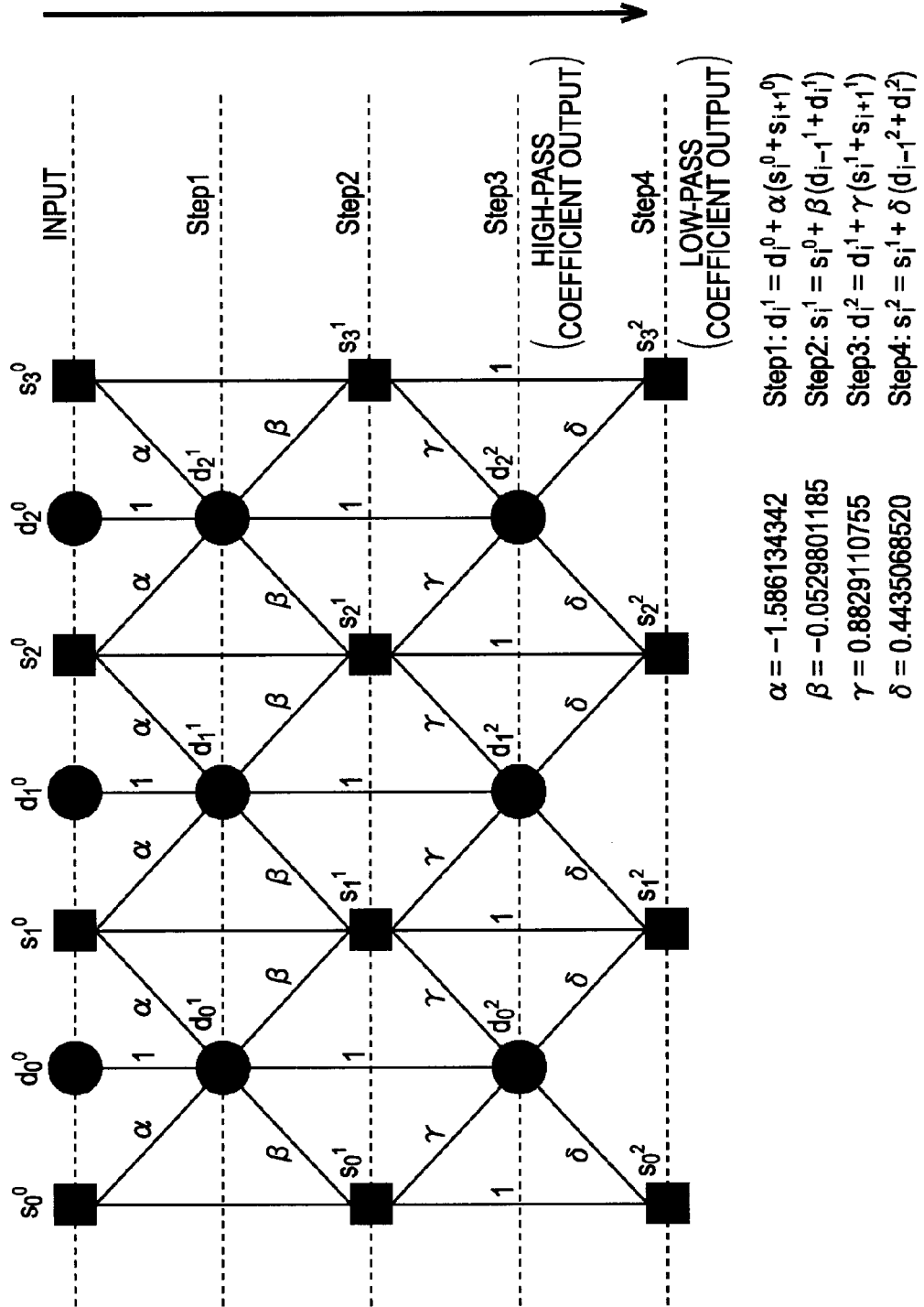
FIG. 5 is a schematic diagram illustrating an example of a 9×7 filter.

The horizontal analysis filter unit 112 and the vertical analysis filter unit 114 actually employ such lifting calculation in order to perform the filtering calculation efficiently. FIG. 5 illustrates a lifting scheme of a Daubechies type 9×7 real-precision filter which has been also used in Part-1 of JPEG 2000 as well. In the figure, the topmost row is an input signal string. Data processing flows from the top to the bottom of a screen and passes through the following four steps, thereby generating high-pass coefficients (coefficients of high-pass components) in Step 3 and low-pass coefficients (coefficients of low-pass components) in Step 4.

$$\text{Step 1: } d_i^1 = d_i^0 + \alpha(s_i^0 + s_{i+1}^0) \tag{1}$$

$$\text{Step 2: } s_i^1 = s_i^0 + \beta(d_{i-1}^1 + d_i^1) \tag{2}$$

$$\text{Step 3: } d_i^2 = d_i^1 + \gamma(s_i^1 + s_{i+1}^1) \tag{3}$$

$$\text{Step 4: } s_i^2 = s_i^1 + \delta(d_{i-1}^2 + d_i^2) \tag{4}$$

($\alpha=-1.586134342$, $\beta=-0.0529801185$, $\gamma=0.8829110755$, $\delta=0.4435068520$)

Figure 6:
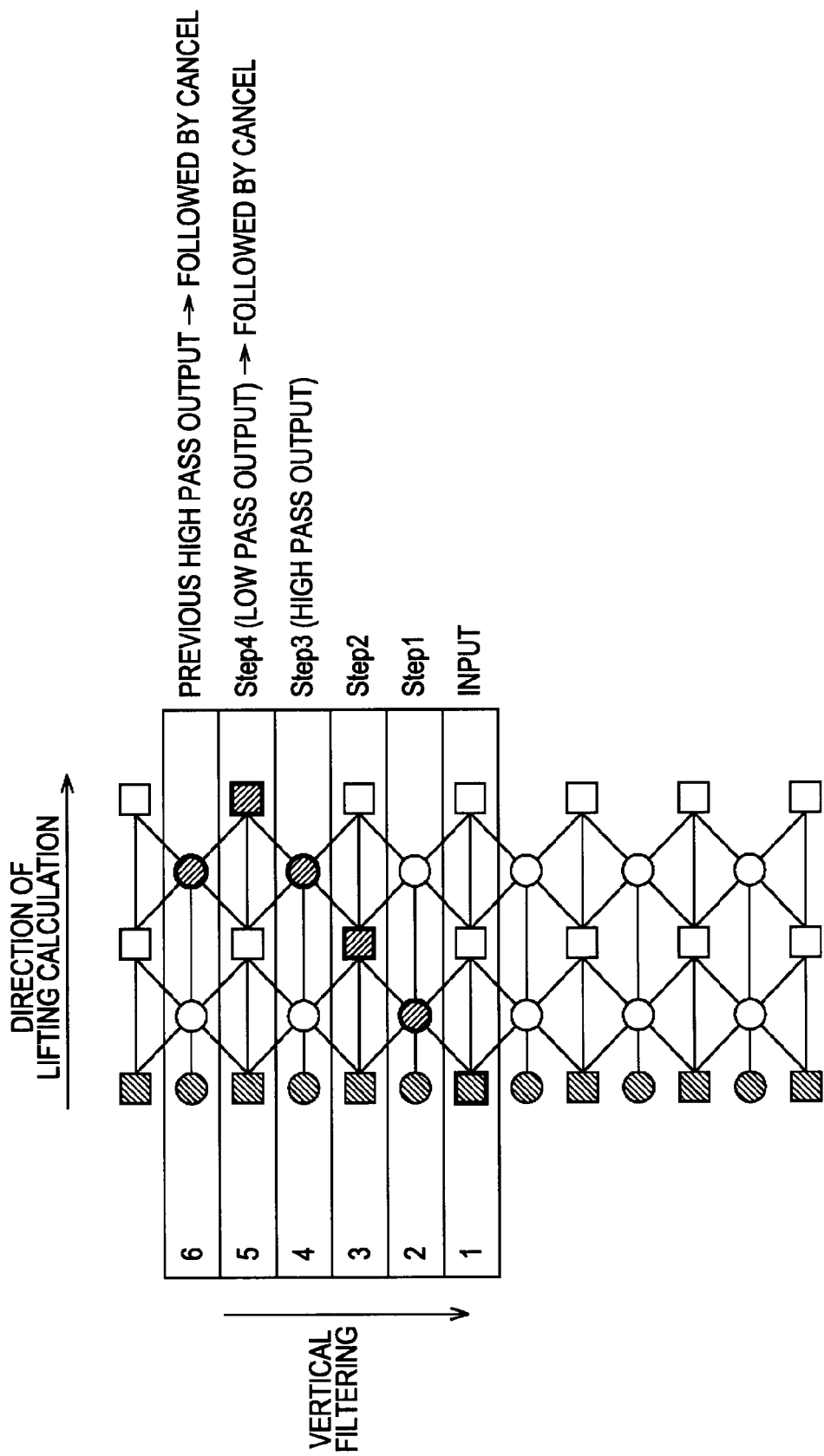
FIG. 6 is a schematic diagram illustrating an example of lifting calculation.

FIG. 6 illustrates an example in which vertical analysis filtering is executed on a group of coefficients in the vertical direction. In other words, FIG. 6 illustrates that the coefficients in the horizontal direction are subjected to the processing of four steps represented by the above equations (1) to (4) to generate high-pass coefficients and low-pass coefficients. As shown in FIG. 6, one set of high-pass and low-pass coefficients can be obtained using six lines, from line 1 to line 6.

Some of coefficients generated in the process of lifting calculation are coefficients (arithmetic coefficients) to be used in the next lifting calculation, so that these coefficients should be latched (stored). In FIG. 6, a dotted elliptic area includes three arithmetic coefficients stored and held by one previous vertical lifting operation and a solid elliptic area under the dotted elliptic area includes three operation coefficients stored and held by the present vertical lifting operation. As shown in FIG. 6, the arithmetic coefficients are two coefficients under calculation and one high-pass coefficient.

As shown in FIG. 6, even if one additional line is input, vertical analysis filtering is not performed because of the feature of the lifting calculation.

Figure 7:
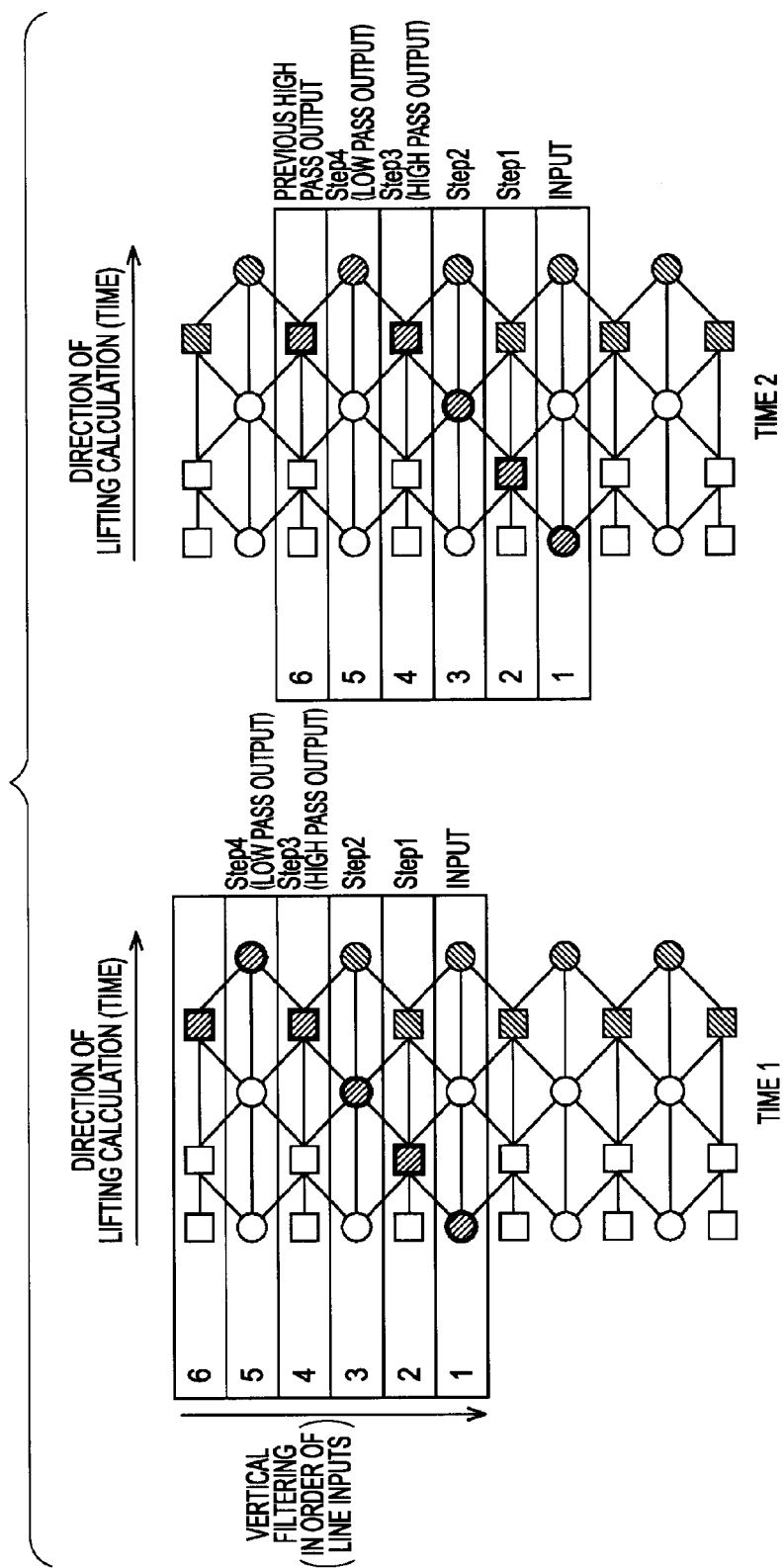
FIG. 7 is a schematic diagram illustrating an example of lifting calculation.

Time 1 shown in the left panel of FIG. 7 illustrates a state when the previous vertical analysis filtering had been performed and Time 2 shown in the right panel of FIG. 7 illustrates a state when the next vertical analysis filtering will be performed.

Thus, two additional lines are used to perform vertical analysis filtering. As a result, one set of low-pass components and high-pass components can be produced. After that, in a similar way, every time two additional lines are input, one set of low-pass components and high-pass components will be generated.

In the above description, the analysis filtering in the vertical direction has been described. The same description may be applied to the case of horizontal analysis filtering by replacing the word "line(s)" with the word "column(s)".

Here, the horizontal analysis filtering is independently performed every one line. In other words, the number of arithmetic coefficients to be latched in each lifting calculation is only three. Thus, such arithmetic coefficients can be easily stored in a small-capacity memory area, such as a flip-flop or the like in the horizontal analysis filter unit 112. In practice, the coefficient of the last input column (line in the case of vertical direction) is typically used in addition to the arithmetic coefficients. This coefficient may be latched or may be input again.

On the other hand, the process described above is simultaneously performed on each column in parallel with the vertical analysis filtering. In other words, the more the number of columns increases, the more the number of arithmetic coefficients to be latched increases accordingly. Therefore, the vertical analysis filter unit 114 allows the coefficient buffer 115 to hold arithmetic coefficients. In this case, the size of the arithmetic coefficients to be latched is only about several kilobytes, so that it can be stored in memory operable at a high speed, such as SRAM (Static Random Access Memory).

[Explanation of Operation]

Figure 8:
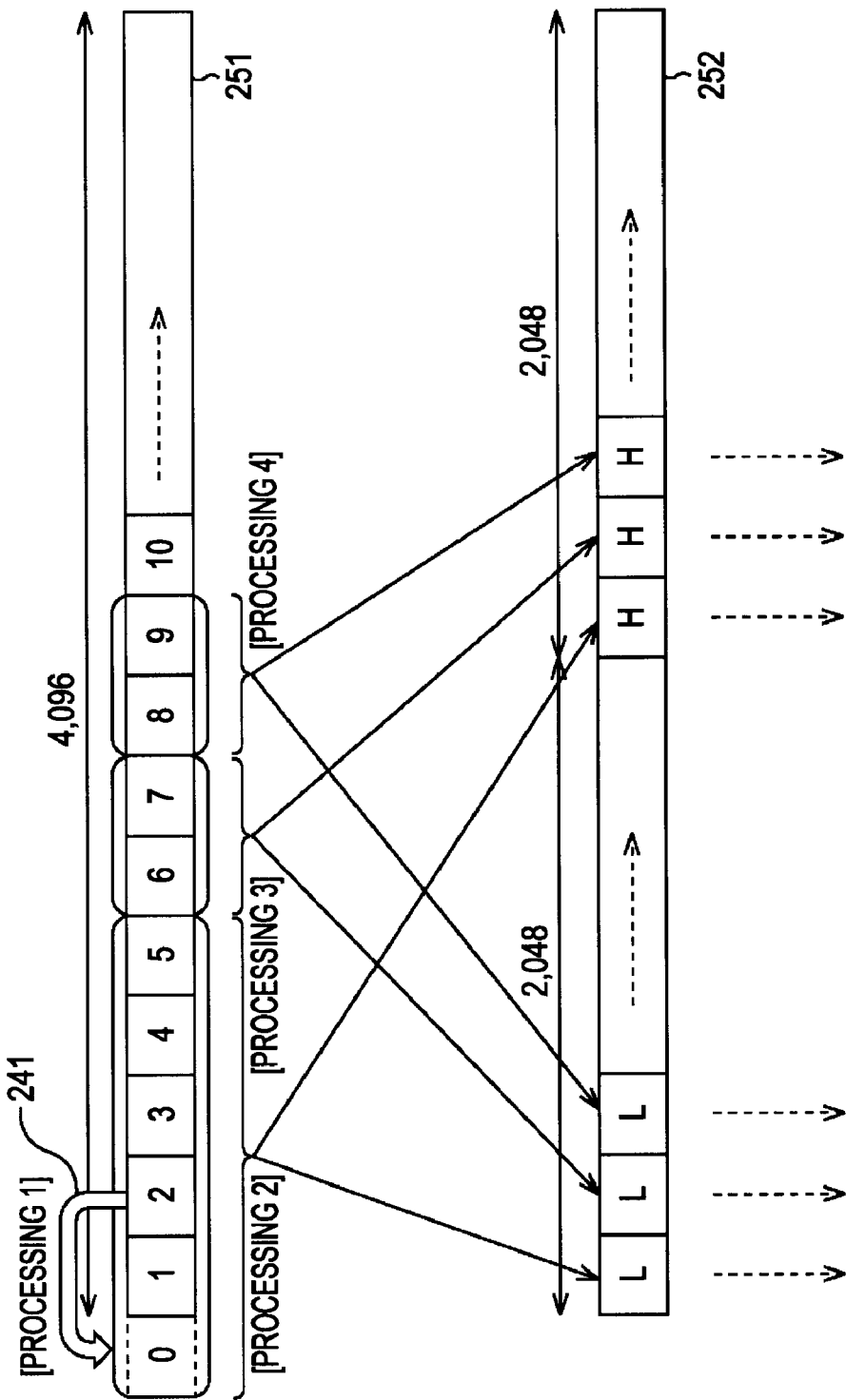
FIG. 8 is a schematic diagram illustrating an exemplary process of analysis filtering.

Next, the operation of the wavelet transformer 100 shown in FIG. 1 will be described. FIG. 8 is a diagram illustrating the state of horizontal analysis filtering. Image data of each line (D10) is supplied every sample in order from the left to the right of an image as represented as a series of numerals (1, 2, . . . , 10, . . . ) in the respective boxes of input data 251 represented on the upper panel of FIG. 8.

The horizontal analysis filter unit 112 is under the control of the scheduler 111 (D16) and performs horizontal analysis filtering every time image data (D10) of desired samples are input. As described above, the horizontal analysis filtering is typically provided with input data for six columns. As indicated by the arrow 241, the horizontal analysis filter unit 112 performs symmetrical extension of the left of an image using input data of the second column (column 2) from the leftmost one, thereby adding one sample (column 0) ("Processing 1").

In other words, if input data of five columns are input, then the horizontal analysis filter unit 112 performs horizontal analysis filtering on the input data of six samples including the symmetrically extended sample ("Processing 2"). Therefore, like the coefficients 252 shown in the lower panel of FIG. 8, both the low-pass coefficients (L) and the high-pass coefficients (H) are generated in the horizontal direction. The horizontal analysis filter unit 112 supplies the low-pass coefficients (L) and the high-pass coefficients (H) generated in the horizontal direction to the line buffer 113 to accumulate them therein (D12).

Since the horizontal analysis filtering generates arithmetic coefficients, the next horizontal analysis filtering can be performed using the arithmetic coefficients. In other words, only data for two columns may be added. When input data of two additional columns are input, the horizontal analysis filter unit 112 performs horizontal analysis filtering on input data of six samples including the latched arithmetic coefficient (one obtained by the last filtering) ("Processing 3").

Since the last input coefficient of the last column (input coefficient) is also necessary, the horizontal analysis filter unit 112 may latch the input coefficient together with the arithmetic coefficient.

As described above, therefore, like the coefficients 252 shown in the lower panel of FIG. 8, both the low-pass coefficients (L) and the high-pass coefficients (H) are generated in the horizontal direction. In this case, the horizontal analysis filter unit 112 also supplies the low-pass coefficients (L) and the high-pass coefficients (H) generated in the horizontal direction to the line buffer 113 to accumulate them therein (D12).

Furthermore, in this case, a new arithmetic coefficient can be obtained (arithmetic coefficient to be latched is updated). When input data of two additional columns are input, the horizontal analysis filter unit 112 performs horizontal analysis filtering on input data of six samples including the latched arithmetic coefficient (one obtained by the last filtering) ("Processing 4").

Subsequently, the same process is repeated up to the rightmost column of the line. In this way, the low-pass coefficients (L) and the high-pass coefficients (H) are generated for one line in the horizontal direction and then accumulated in the line buffer 113.

Figure 9:
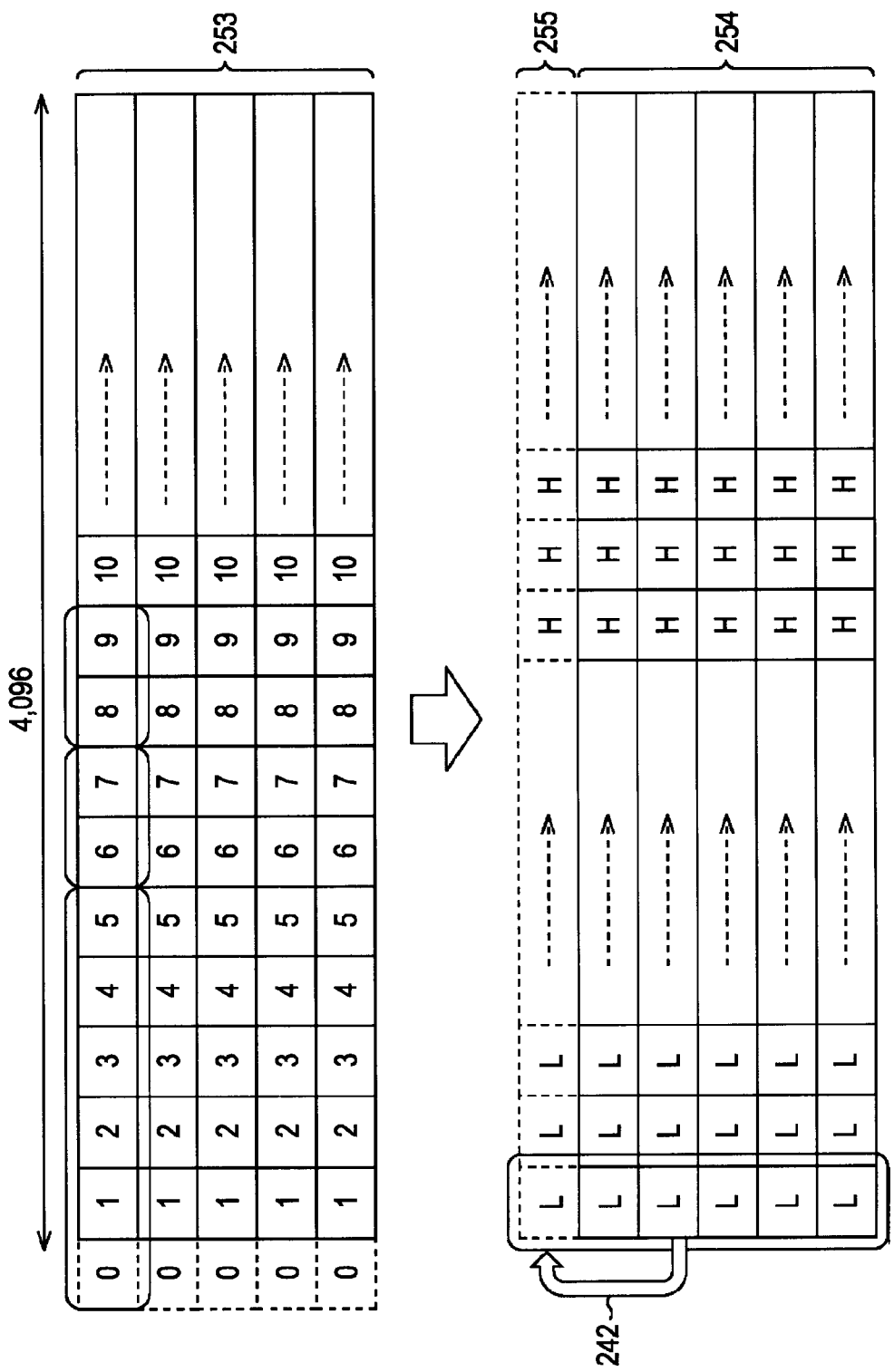
FIG. 9 is a schematic diagram illustrating an exemplary process of analysis filtering.

As described above, the analysis filtering uses coefficients of six lines. Thus, the horizontal analysis filter unit 112 performs horizontal analysis filtering for five lines. In other words, for example, input data 253 of five lines represented on the upper panel of FIG. 9 are converted into coefficients 254 of five lines represented in the lower panel of FIG. 9.

Every time the coefficient of one line is accumulated in the line buffer 113, for example, the horizontal analysis filter unit 112 notifies such a fact to the vertical analysis filter unit 114 (D11). When the coefficients 254 of five lines are accumulated in the line buffer 113, the vertical analysis filter unit 114 controlled by the scheduler 111 (D17) reads out the coefficients 254 therefrom (D13).

As indicated by the arrow 242, the vertical analysis filter unit 114 performs symmetrical extension of the upper end of the image using the coefficients of the second line from the above, thereby adding coefficients 255 of one line. In other words, if the coefficients of five lines are obtained, the vertical analysis filter unit 114 performs vertical analysis filtering on the coefficients of six lines including the symmetrically extended portion.

Figure 10:
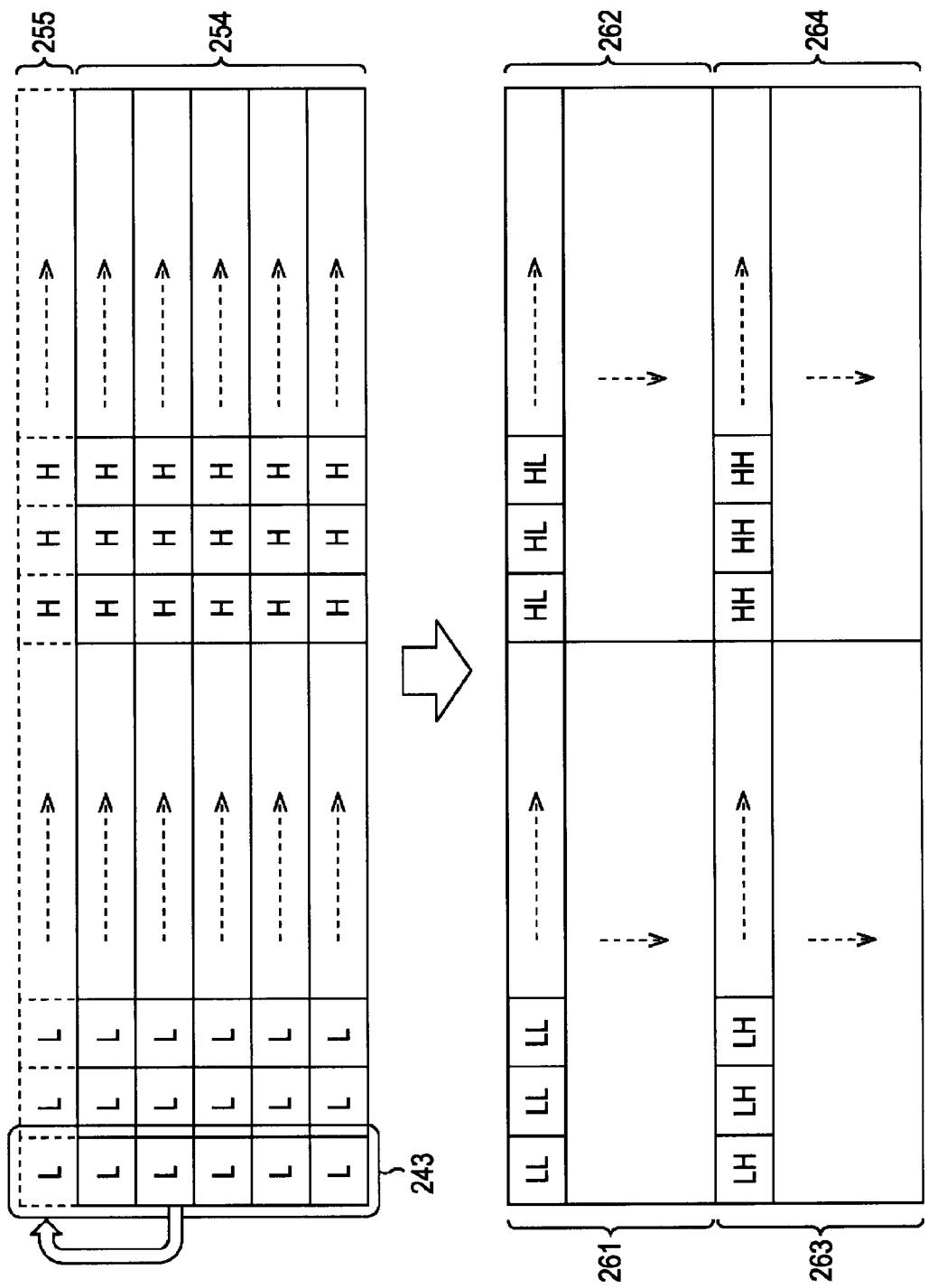
FIG. 10 is a schematic diagram illustrating an exemplary process of analysis filtering.

The vertical analysis filtering is performed on each of all the columns as shown in frame 243 of the upper panel of FIG. 10. Therefore, the coefficients of the respective columns can be divided into low-pass components and high-pass components in the vertical direction.

In other words, as shown in the lower part of FIG. 10, the low-pass component in the horizontal direction is divided into an LL component 261 composed of low-pass components in both the horizontal and vertical directions and a LH component 263 composed of a low-pass component in the horizontal direction and a high-pass component in the vertical direction.

Furthermore, as shown in the lower part of FIG. 10, the high-pass component in the horizontal direction is divided into a HL component 262 composed of a high-pass component in the horizontal direction and a low-pass component in the vertical direction and a HH component 264 composed of high-pass components in both the horizontal and vertical directions.

Figure 11:
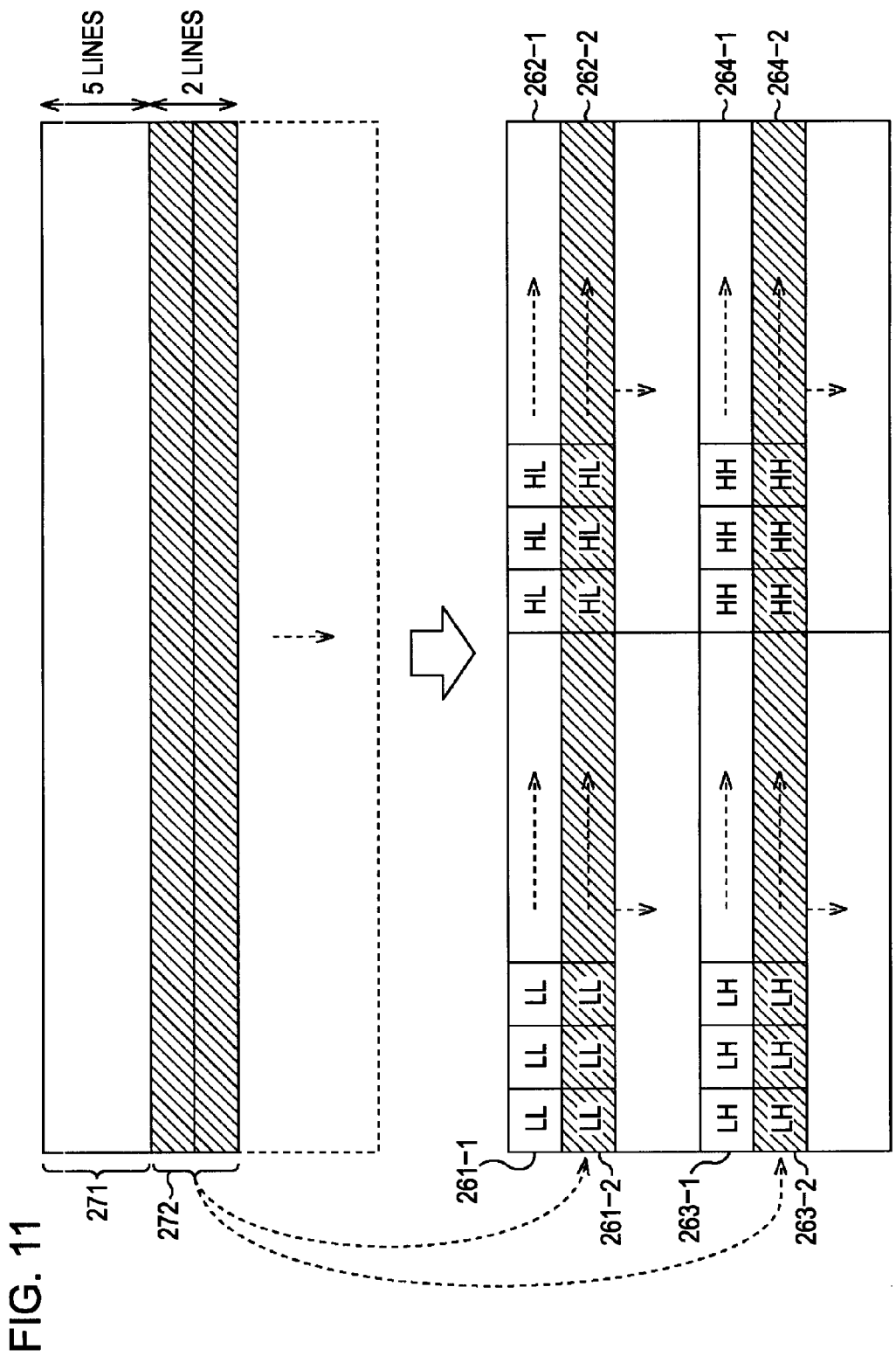
FIG. 11 is a schematic diagram illustrating an exemplary process of analysis filtering.

In other words, as shown in the upper part of FIG. 11, from input data of five lines on the upper part of the image generates, one line of an LL component 261-1 composed of low-pass components in both the horizontal and vertical directions is generated. Similarly, one line of a HL component 262-1 composed of a high-pass component in the horizontal direction and a low-pass component in the vertical direction is generated. Similarly, one line of a LH component 263-1 composed of a low-pass component in the horizontal direction and a high-pass component in the vertical direction is generated. Similarly, one line of a HH component 264-1 composed of a high-pass component in the horizontal direction and a low-pass component in the vertical direction is generated.

At this time, an arithmetic coefficient is generated in vertical analysis filtering. Thus, like the horizontal analysis filtering, the next vertical analysis filtering can be executed by only the addition of two lines.

The vertical analysis filter unit 114 supplies the generated arithmetic coefficients to the coefficient buffer 115 (D14) and the generated arithmetic coefficients is then held therein. Subsequently, if the arithmetic coefficients are held in the coefficient buffer 115, the vertical analysis filter unit 114 reads out the arithmetic coefficients from the coefficient buffer 115 (D15) and vertical analysis filtering is then performed using arithmetic coefficients in addition to the input coefficients. Since the last inputted coefficient of the last line (input coefficient) is also necessary, the vertical analysis filter unit 114 may allow the coefficient buffer 115 to hole the input coefficient together with the arithmetic coefficients.

In other words, as shown in the upper part of FIG. 11, if input data of two lines are additionally input, then one line of a LL component 261-2 composed of low-pass components in both the horizontal and vertical directions is generated. Similarly, one line of a HL component 262-2 composed of a high-pass component in the horizontal direction and a low-pass component in the vertical direction is generated. Similarly, one line of a LH component 263-2 composed of a low-pass component in the horizontal direction and a high-pass component in the vertical direction is generated. Similarly, one line of a HH component 264-2 composed of a high-pass component in the horizontal direction and a low-pass component in the vertical direction is generated.

Subsequently, arithmetic coefficients are obtained each time. Thus, it is possible to perform analysis filtering every two lines and one line of each component can be generated accordingly.

If the vertical analysis filter unit 114 is free of any calculation result coefficient at the final division level, the coefficients of the respective components, HL, LH, and HH components, among the calculation results are input (D19). In addition, the vertical analysis filter 114 supplies the coefficient of LL component to the horizontal analysis filter unit 112 (D18) and the LL component is then subjected to analysis filtering again.

If the calculation result coefficient is one at the final division level, then the vertical analysis filter unit 114 outputs all of the calculation results (including the coefficients of LL components) to the output (D19).

As described above, in the horizontal analysis filtering and the vertical analysis filtering, the amount of input data to be used varies depending on whether the arithmetic coefficient, which is one available to the present filing calculation, is present. In other words, when an arithmetic coefficient generated by analysis filtering is used in the next analysis filtering, the analysis filtering can be executed on every smaller amount of input data every time.

The scheduler 111 controls both the horizontal analysis filter unit 112 and the vertical analysis filter unit 114 and then uses the arithmetic coefficients to execute the analysis filtering on a smaller amount of input data.

More specifically, the scheduler 111 defines a state in which any available arithmetic coefficient is not present, such as in the case of the left end of an image in horizontal analysis filtering and the upper end of an image in vertical analysis filtering, as an "unsteady state". In addition, the scheduler 111 defines as a "steady state" a state in which any available arithmetic coefficient is not present, such as in the case of the left end of an image in horizontal analysis filtering and the upper end of an image in vertical analysis filtering.

Furthermore, the scheduler 111 controls the horizontal analysis filter unit 112. In each state, horizontal analysis filtering is executed every time data of columns to be used are input. For example, when analysis filtering is performed using a 9×7 filter, the scheduler 111 controls the horizontal analysis filter unit 112. In the unsteady state, horizontal analysis filtering is executed upon input of data of five columns. Furthermore, in the steady state, the scheduler 111 executes horizontal analysis filtering every time the data of two columns are input.

Furthermore, the scheduler 111 controls the vertical horizontal analysis filter unit 114. In each state, vertical analysis filtering is executed every time the data of one line to be used are input. For example, when analysis filtering is performed using a 9×7 filter, the scheduler 111 controls the horizontal analysis filter unit 112. In the unsteady state, vertical analysis filtering is executed upon input of data of five lines. Furthermore, in the steady state, the scheduler 111 executes vertical analysis filtering every time the data of two lines are input.

In other words, the scheduler 111 controls both the horizontal analysis filter unit 112 and the vertical analysis filter unit 114. In each of the steady state and the unsteady state, analysis filtering is executed on the frequency components of an image signal with a desired (suitable) amount of information.

Since the scheduler 111 controls as described above, the scheduler 111 is able to reduce the amount of data to be stored around the same time, the amount of memory used in the wavelet transform process, or a storage capacity used in the wavelet transform process can be reduced. In particular, a memory capacity used in the wavelet transformer 100 can be reduced and the costs of the wavelet transformer 100 can be reduced.

Figure 12:
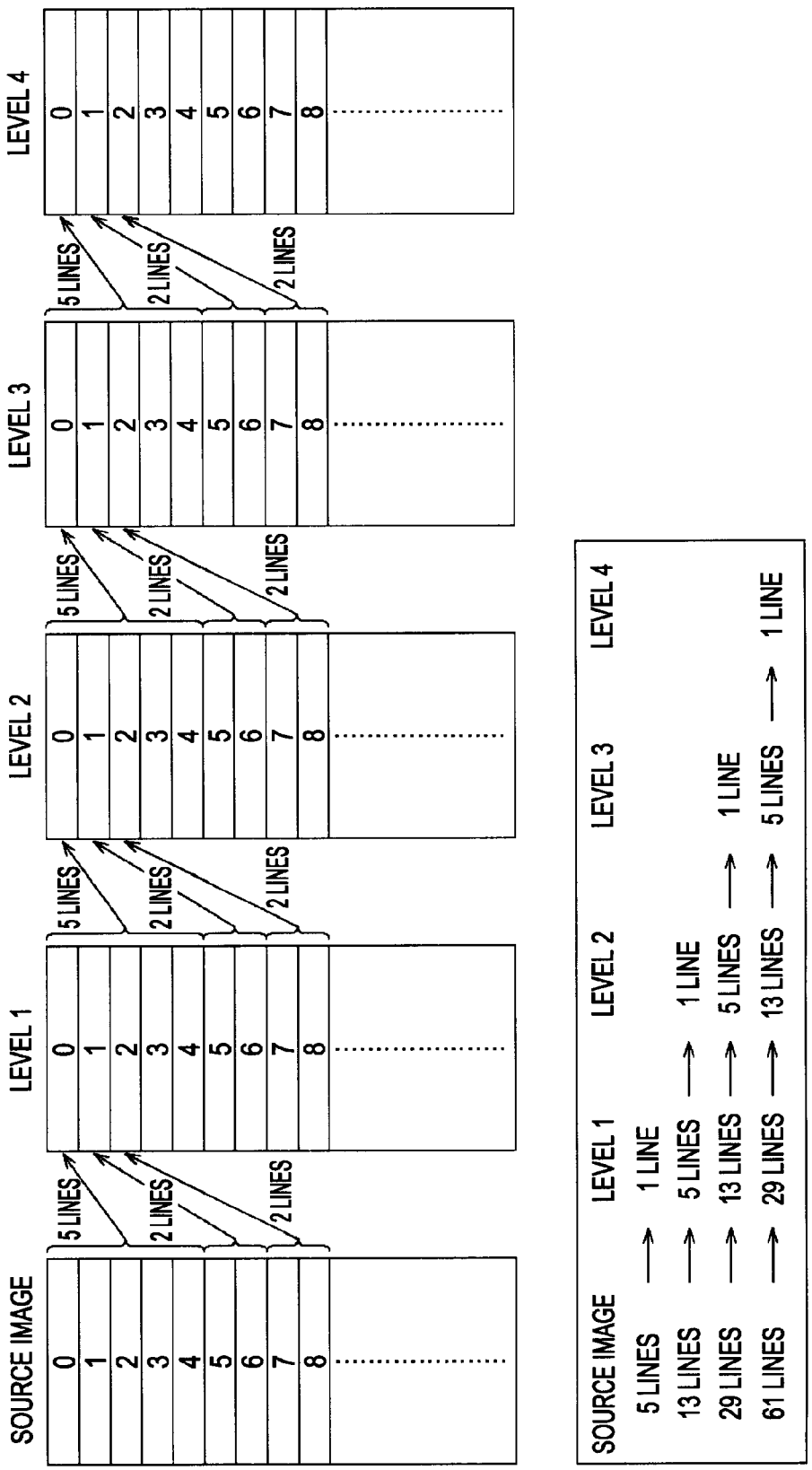
FIG. 12 is a schematic diagram illustrating an exemplary process of analysis filtering.

Furthermore, when repeating the above analysis filtering two or more times (division level 2 or higher), the scheduler 111 controls both the horizontal analysis filter unit 112 and the vertical analysis filter unit 114 to execute analysis filtering as shown in FIG. 12.

In other words, the wavelet transformer 100 generates coefficients of one line at division level 1 when an original image (source image) of five lines is input under the control of the scheduler 111.

The process is repeatedly performed under each of the unsteady state and the steady state to generate coefficients of five lines from the original image of 13 lines at division level 1. Then, the wavelet transformer 100 generates coefficients of one line at division level 2 from the coefficients of five lines at division level 1.

Similarly, the process under each of the above states is repeatedly executed, thereby generating coefficients of 13 lines at division level 1 from the original image of 29 lines. Then, the wavelet transformer 100 generates coefficients of five lines at division level 2 from the coefficients of 13 lines at division level 1. Then, the wavelet transformer 100 generates coefficients of one line at division level 3 from the coefficients of five lines at division level 2.

Similarly, the process under each of the above states is repeatedly executed, thereby generating coefficients of 29 lines at division level 1 from the original image of 61 lines. Furthermore, the wavelet transformer 100 generates coefficients of 13 lines at division level 2 from the coefficients of 29 lines at division level 1. Furthermore, the wavelet transformer 100 generates coefficients of 5 lines at division level 3 from the coefficients of 13 lines at division level 2. Then, the wavelet transformer 100 generates coefficients of one line at division level 4 from the coefficients of five lines at division level 3.

The scheduler 111 repeats such control to execute analysis filtering on all the lines of the picture. By controlling in this way, the scheduler 111 can reduce the amount of memory used in the wavelet transform process.

[Explanation of Process Flow]

Referring now to a flowchart in FIG. 13, an example of the flow of the above wavelet transform process will be described. The wavelet transformer 100 of FIG. 1 executes the wavelet transform process at each division level. Here, there is no arithmetic coefficient when starting the wavelet transform process. Thus, the scheduler 111 places both the horizontal analysis filtering and the vertical analysis filtering in the unsteady state.

If the wavelet transform process is started, then the horizontal analysis filter unit 112 under control of the scheduler 111 executes a process of horizontal analysis filtering to perform horizontal analysis filtering on coefficients of one line.

Since the vertical analysis filtering is in the unsteady state, the scheduler 111 determines whether the horizontal analysis filter unit 112 performs horizontal analysis filtering for five lines in Step S102. Until the horizontal analysis filter unit 112 determines that five lines are processed, the scheduler 111 returns the process to Step S101 and repeatedly executes the process of horizontal analysis filtering.

If it is determined that processing of five lines is completed in Step S102, then the process proceeds to Step S100. Since the vertical analysis filtering is in the unsteady state, the vertical analysis filter unit 114 under control of the scheduler 111 performs symmetrical extension to generate one additional line in Step S103.

In Step S104, the vertical analysis filter unit 114 performs vertical analysis filtering on the coefficients of five lines obtained by the process of horizontal analysis filtering. In Step S105, the vertical analysis filter unit 114 outputs output components to the outside of the apparatus. For instance, if the division level is not the undermost level, the vertical analysis filter unit 114 outputs HL, LH, and HH components obtained by analysis filtering to the outside of the apparatus. For instance, furthermore, if the division level is the undermost level, the vertical analysis filter unit 114 outputs all the components obtained by analysis filtering to the outside of the apparatus.

In Step S106, the vertical analysis filter unit 114 stores arithmetic coefficients obtained by the process in Step S104 in the coefficient buffer 115. The coefficients of the last input line (input coefficients) are also stored in the coefficient buffer 115 together with the calculation. Alternatively, the input coefficient may be input again without storing.

Since the arithmetic coefficients are generated, the scheduler 111 makes the state of vertical analysis filtering into a steady state. In Step S107, the scheduler 111 determines whether the vertical analysis filter unit 114 completes the processing up to the undermost line of an image (picture).

The scheduler 111 may count the number of the processed lines on the basis of, for example, synchronized information in an input image signal and the number of times of process execution. The scheduler 111 determines whether the process is performed up to the undermost line on the basis of the counted number. In addition, if it is determined that the process is performed on a line in the middle of the image, then the process proceeds to Step 108.

In Step S108, the horizontal analysis filter unit 112 controlled by the scheduler 111 executes the same process of horizontal analysis filtering as that of Step S101. Since the vertical analysis filtering is in the steady state, the scheduler 111 judges whether the horizontal analysis filter unit 112 has performed the horizontal analysis filtering for two lines in Step S109. The scheduler 111 returns the process to Step S108 and allows the horizontal analysis filter unit 112 to repeat the process of horizontal analysis filtering until it is determined that two lines are processed by the horizontal analysis filter unit 112.

In Step S109, if it is determined that two lines are processed, then the process proceeds to Step S110. Since the vertical analysis filtering is in the steady state, the vertical analysis filter unit 114 under control of the scheduler 111 reads out arithmetic coefficients and input coefficients from the coefficient buffer 115 in Step S110.

In Step S111, the vertical analysis filter unit 114 performs vertical analysis filtering on the arithmetic coefficients, input coefficients, and coefficients of two lines obtained by the process horizontal analysis filtering. In Step S112, the vertical analysis filter unit 114 outputs the output components to the outside of the apparatus. For instance, if the division level is not the undermost level, the vertical analysis filter unit 114 outputs HL, LH, and HH components obtained by analysis filtering to the outside of the apparatus. For instance, furthermore, if the division level is the undermost level, the vertical analysis filter unit 114 outputs all the components obtained by analysis filtering to the outside of the apparatus.

In Step S113, the vertical analysis filter unit 114 stores arithmetic coefficients obtained by the process in Step S111 in the coefficient buffer 115. The coefficients of the last input line (input coefficients) are also stored in the coefficient buffer 115 together with the arithmetic coefficient. Alternatively, the input coefficient may be input again without storing.

If the processing of Step S115 is completed, then the process returns to Step S107 and the subsequent processing is repeated. As described above, the process from Step S107 to Step S113 is repeatedly executed until the undermost line of the image is processed. In Step S107, if it is determined that the process is completed up to the undermost line, then the wavelet transform process is ended.

Figure 13:
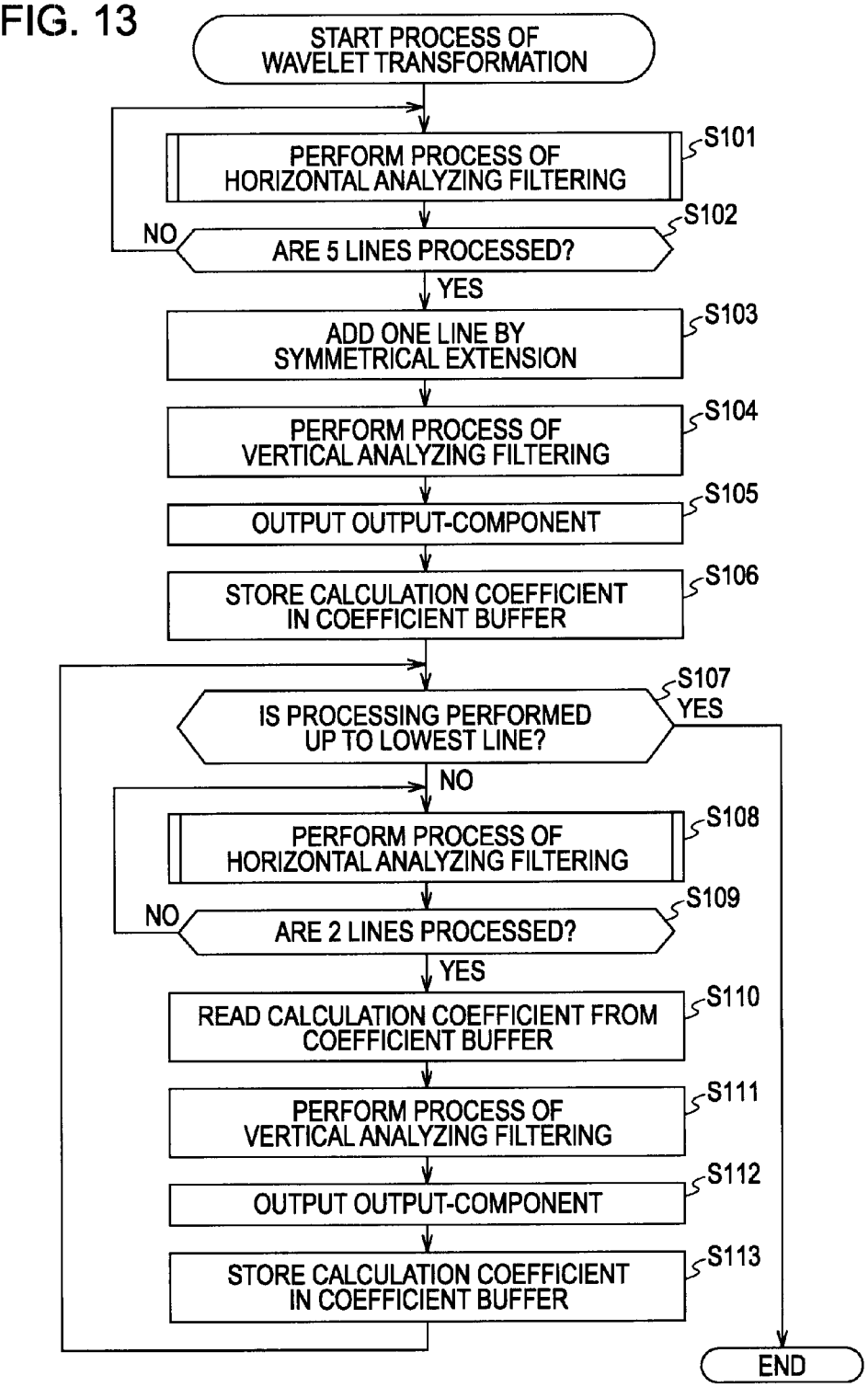
FIG. 13 is a flowchart illustrating an exemplary process of wavelet transform process.
Figure 14:
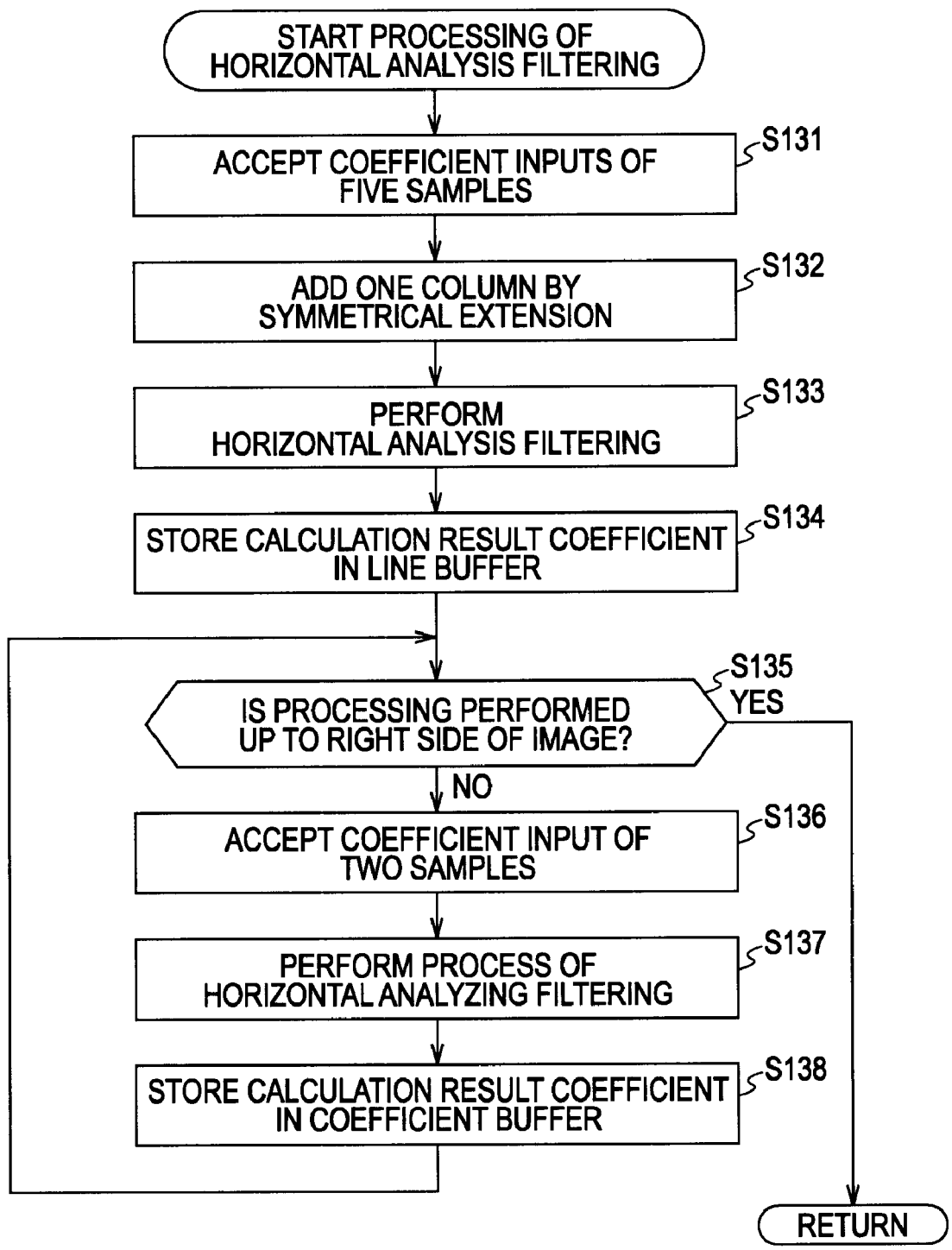
FIG. 14 is a flowchart illustrating an exemplary process of horizontal analysis filtering.

Referring now to the flow chart shown in FIG. 14, an example of the process flow of horizontal analysis filtering executed in Step S101 or Step S108 in FIG. 13. Here, there is no arithmetic coefficient when starting the process of horizontal analysis filtering. Thus, the scheduler 111 places horizontal analysis filtering in the unsteady state.

If the process of horizontal analysis filtering is started, the horizontal analysis filtering is in the unsteady state and the horizontal analysis filter unit 112 under control of the scheduler 111 then receives inputs of coefficients of five samples in Step S131.

In Step S132, the horizontal analysis filter unit 112 performs symmetrical extension to provide coefficients of one additional column. In Step S133, the horizontal analysis filter unit 112 performs horizontal analysis filtering on six samples obtained by the processing in Step S131 and Step S132. In Step S134, the vertical analysis filter unit 112 stores the resulting coefficients of the calculation (calculation result coefficient) in the line buffer 113.

At this time, the horizontal analysis filter unit 112 holds the calculation result coefficients obtained by the processing in Step S133. The horizontal analysis filter unit 112 holds the coefficients of the last input columns (input coefficients) together with the arithmetic coefficients. Alternatively, the input coefficient may be input again without storing.

Since the arithmetic coefficients are generated, the scheduler 111 makes the state of horizontal analysis filtering into a steady state. In Step S135, the scheduler 111 determines whether the horizontal analysis filter unit 112 completes the processing up to the right end of the image (picture).

The scheduler 111 may count the number of the processed columns on the basis of, for example, synchronized information in an input image signal and the number of times of process execution. The scheduler 111 determines whether the process is performed up to the right end of the image on the basis of the counted number. In addition, if it is determined that the process is still performed on a column in the middle of the image, then the process proceeds to Step 136.

In Step S136, the horizontal analysis filter unit 112 under control of the scheduler 111 receives inputs of coefficients of two samples because the horizontal analysis filtering is in the steady state. In Step S137, the horizontal analysis filter unit 112 performs horizontal analysis filtering on six samples including coefficients received by the processing in Step S136, the latched arithmetic coefficients, and the input coefficients.

In Step S138, the vertical analysis filter unit 112 stores the calculation result coefficient in the line buffer 113. At this time, the horizontal analysis filter unit 112 holds the calculation result coefficients obtained by the processing in Step S137. The horizontal analysis filter unit 112 holds the coefficients of the last input columns (input coefficients) together with the arithmetic coefficients. Alternatively, the input coefficient may be input again without storing.

If the processing of Step S138 is completed, then the process returns to Step S135 and the subsequent processing is repeated. As described above, the process from Step S135 to Step S138 is repeatedly executed until the right end of the image is processed. In Step S135, if it is determined that the process is completed up to the right end of the image, then the process of horizontal analysis filtering is ended.

As described above, the wavelet transformer 100 can reduce is able to reduce the amount of data to be stored around the same time. In other words, the wavelet transformer 100 is able to reduce the amount of memory used in the wavelet transformation process, or a storage capacity used in the wavelet transform process. In particular, a memory capacity used in the wavelet transformer 100 can be reduced and the costs of the wavelet transformer 100 can be reduced.

Since the wavelet transformer 100 uses a smaller amount of memory, various kinds of buffer can be designed using high-speed accessible memory such as SRAM. For instance, when the wavelet transformer 100 is mounted on LSI or the like, the wavelet transformer 100 can be enclosed in a chip including other circuits. In this case, the amount of memory used is small, so that the wavelet transformer 100 using only inner memory of LSI (Large Scale Integration) as a memory region of the line buffer 113 and the coefficient buffer 115.

Since any external memory is optional, the chip may be made smaller. The more the size of the chip is smaller, the more the costs of the wavelet transformer 100 can be reduced.

Furthermore, the data transmission rate between the wavelet transform unit and the memory unit can be enhanced by installing memory to be used in the apparatus; thus the wavelet transformer 100 can be provided without using external memory. In other words, the wavelet transformer 100 is allowed to perform a wavelet transform process faster. Therefore, for example, a HDTV (High Definition Television) video can be wavelet-transformed in real time.

Alternatively, the scheduler 111 may be designed to determine whether it is in the steady state or in the unsteady state every time analysis filtering is performed and a wavelet-transform process may be performed depending on the result of the determination. In this case, the processing executed in each state is as described above. Furthermore, the determination of steady state/unsteady state may be performed on a position for filtering or may be performed depending on whether the desired arithmetic coefficients and input coefficients are held.

2. Second Embodiment

[Explanation of Use of 5×3 Filter]

The lifting calculation using the 9×7 filter has been described. Alternatively, the lifting calculation may be performed using any of other filters. For example, a 5×3 filter may be used.

Figure 15:
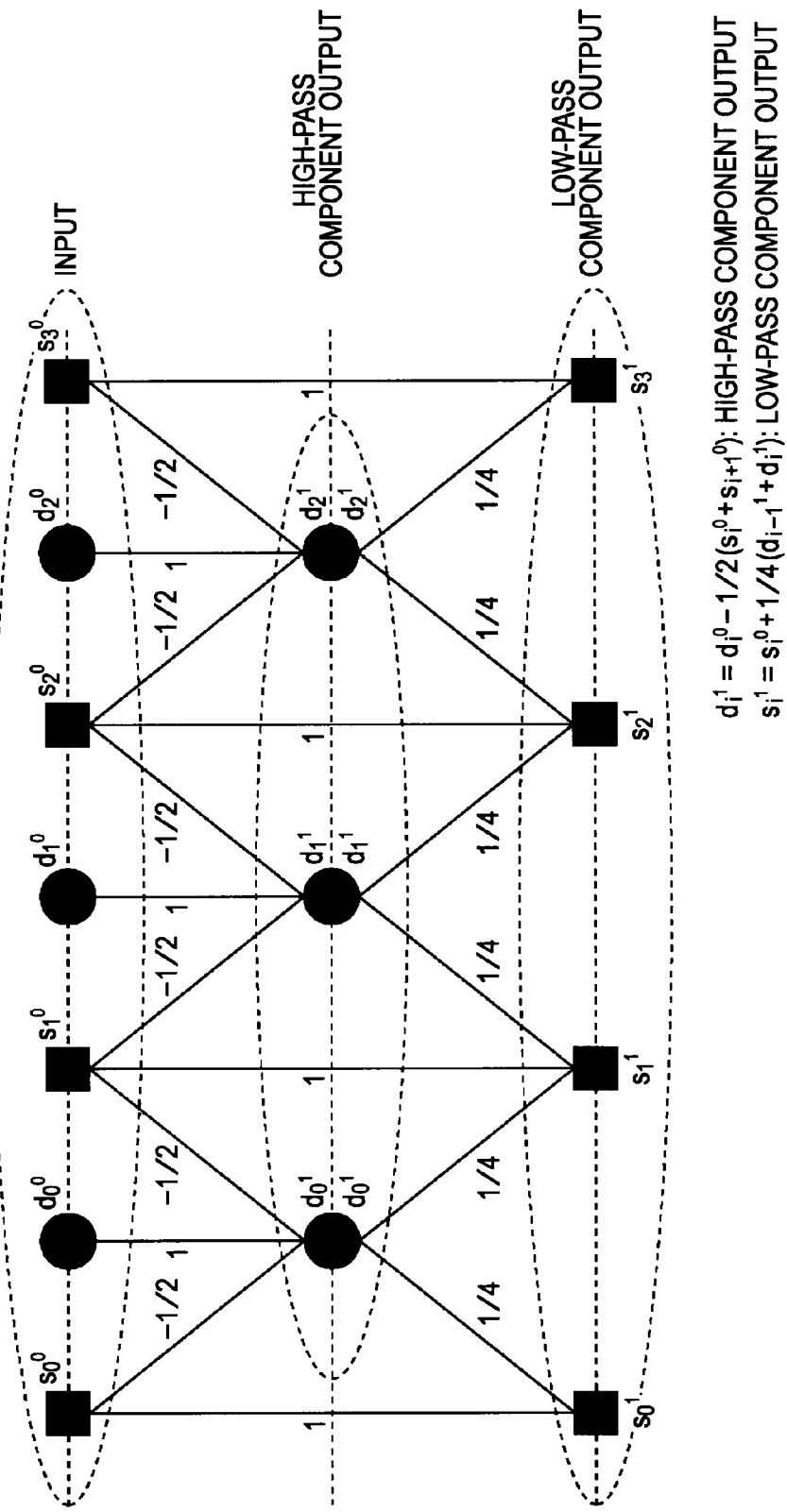
FIG. 15 is a schematic diagram illustrating an example of a 5×3 filter.

FIG. 15 is a schematic diagram illustrating lifting calculation using a 5×3 filter. In the figure, the uppermost string is an input signal string. Data processing flows from the top to the bottom of a screen to generate outputs of high-pass coefficients and low-pass coefficients from the following equations (5) and (6):

$$d_i^1 = d_i^0 - 1/2(s_i^0 + s_{i+1}^0) \tag{5}$$

$$s_i^1 = s_i^0 + 1/4(d_{i-1}^1 + d_i^1) \tag{6}$$

Figure 16:
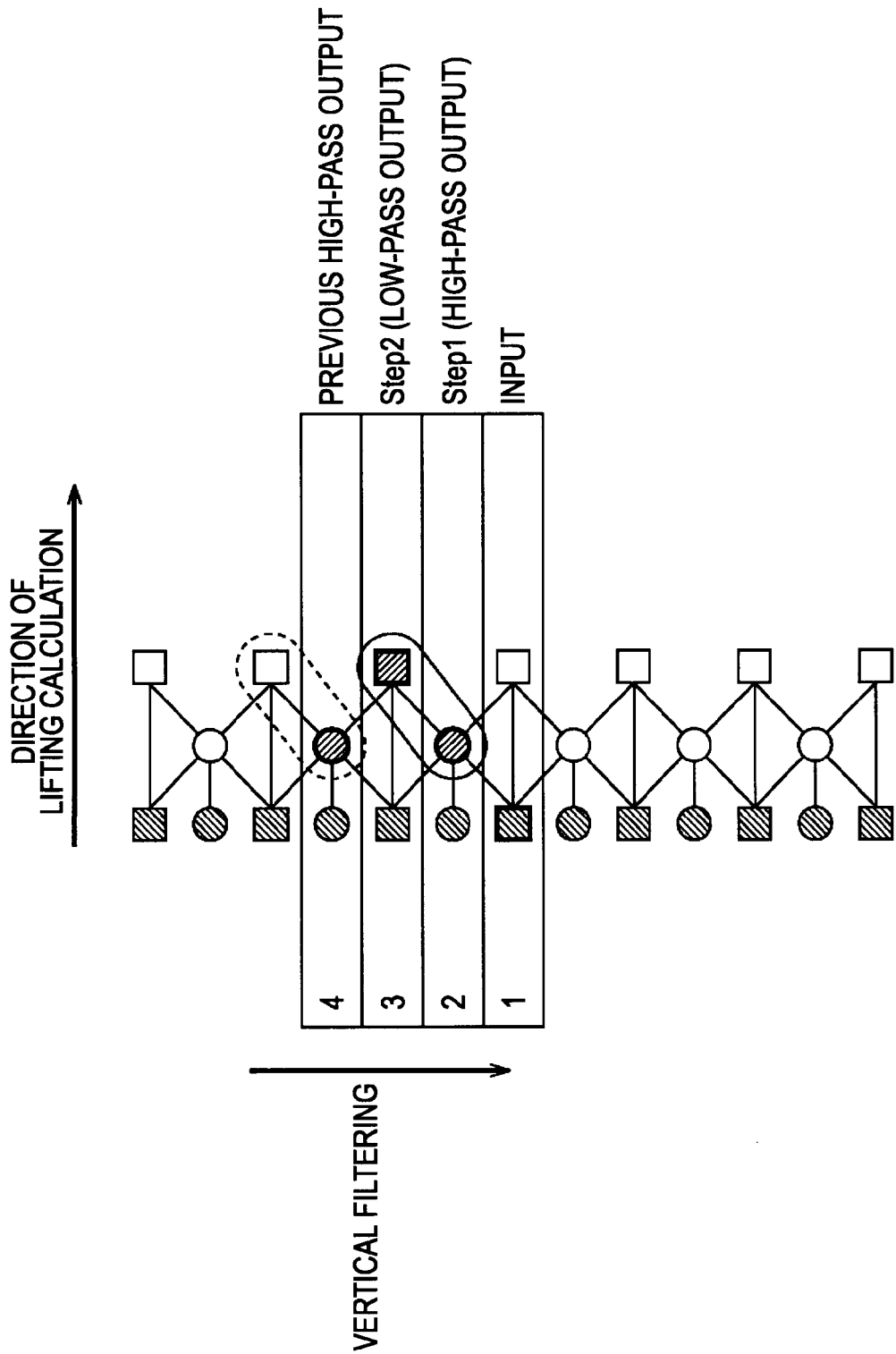
FIG. 16 is a schematic diagram illustrating an example of lifting calculation.

FIG. 16 is a diagram illustrating an example in which vertical analysis filtering is executed on a group of coefficients in the vertical direction. As shown in FIG. 16, one set of high-pass and low-pass coefficients can be obtained using four lines, from line 1 to line 4.

Some of coefficients generated in the process of lifting calculation are coefficients (arithmetic coefficients) to be used in the next lifting calculation, so that these coefficients should be latched (stored). In FIG. 16, a dotted elliptic area includes two coefficients as calculation results generated by one previous vertical lifting calculation and a solid elliptic area under the dotted elliptic area includes two coefficients as calculation results generated by the present vertical lifting operation.

In other words, an arithmetic coefficient includes one high-pass coefficient. Specifically, in the case of the 5×3 filter, the next lifting calculation uses one arithmetic coefficient and an input coefficient of the last line (i.e., these coefficient are latched).

Figure 17:
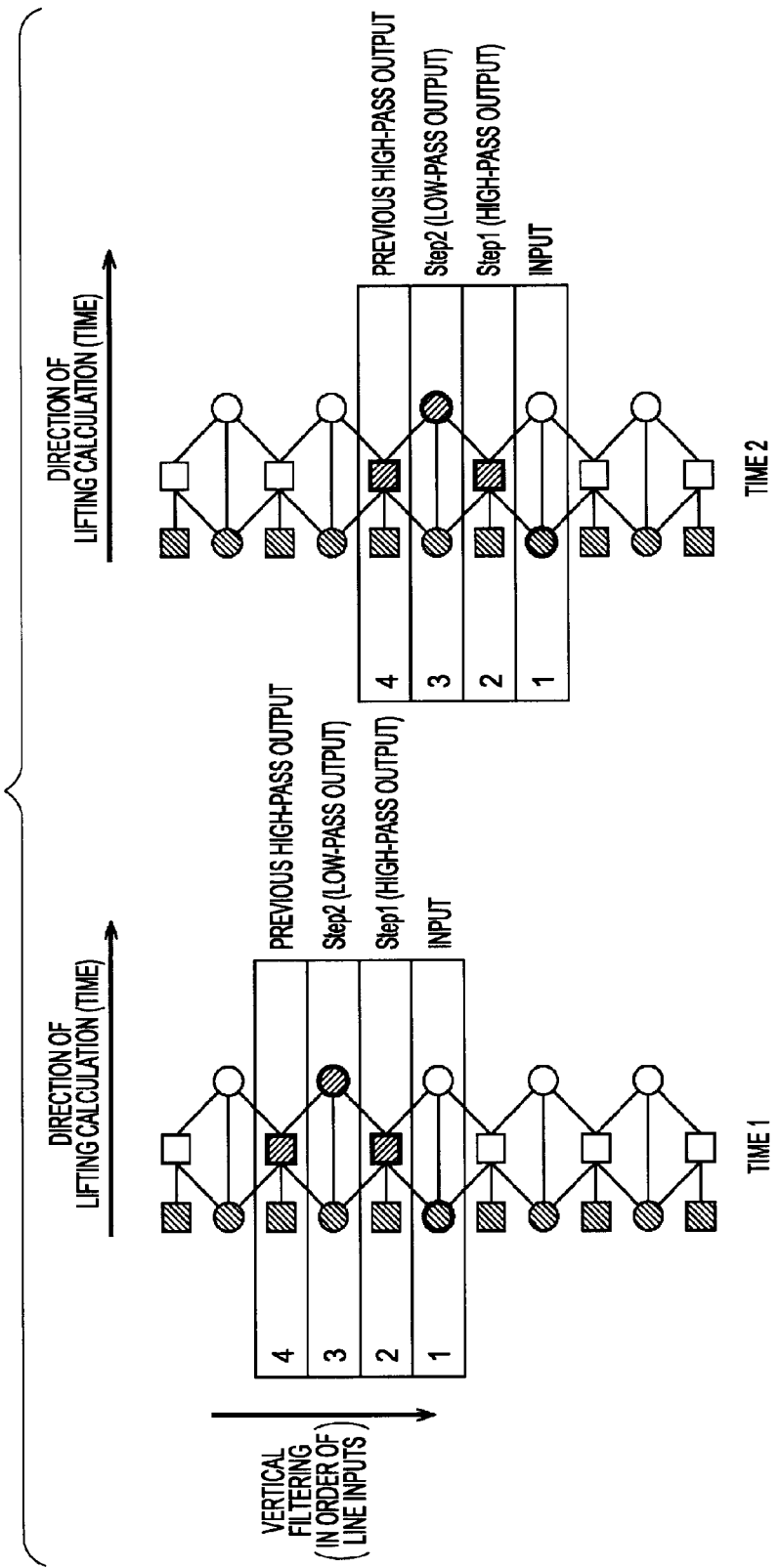
FIG. 17 is a schematic diagram illustrating an example of lifting calculation.

In the case of the 5×3 filter, as shown in FIG. 16, vertical analysis filtering is not performed because of the feature of the lifting calculation even if one additional line is input. Time 1 shown in the left part of FIG. 17 illustrates a state when the previous vertical analysis filtering had been performed and Time 2 shown in the right part of FIG. 17 illustrates a state when the next vertical analysis filtering will be performed.

Thus, two additional lines are used in order to perform vertical analysis filtering just as in the case of the 9×7 filter. As a result, one set of a low-pass component and a high-pass component can be produced. After that, in a similar way, every time two additional lines are input, one set of low-pass components and high-pass components will be generated.

In the above description, the analysis filtering in the vertical direction has been described. The same description may be applied to the case of horizontal analysis filtering by replacing the word "line(s)" with the word "column(s)".

In the case of the 5×3 filter, symmetrical extension is also performed in the unsteady state. Therefore, in the case of the 5×3 filter, input data of three lines (three columns) are used in the unsteady state and input data of two lines (two columns) are used in the steady state.

Thus, the number of lines (columns) for analysis filtering varies with the type of a filter. However, the process may be performed in a manner similar to the 9×7 filter. In other words, without depending on the kind of the filter, the scheduler 111 controls both a horizontal analysis filter unit 112 and a vertical analysis filter unit 114 in two different states, a steady state and an unsteady state. The scheduler 111 is able to execute analysis filtering in each state at an appropriate can be executed at a suitable interval.

Therefore, the scheduler 111 can reduce the memory usage of a wavelet transform process.

Specifically, when analysis filtering is performed using a 5×3 filter, the scheduler 111 controls the horizontal analysis filter unit 112. In the unsteady state, horizontal analysis filtering is executed on input data of three columns. Furthermore, the scheduler 111 controls the horizontal analysis filter unit 112. In the steady state, horizontal analysis filtering is executed every time the input data is entered.

Furthermore, the scheduler 111 controls the vertical horizontal analysis filter unit 114. In the unsteady state, vertical analysis filtering is executed on coefficients of three lines. Furthermore, the scheduler 111 controls the vertical horizontal analysis filter unit 114. In the steady state, vertical analysis filtering is executed every time coefficients of two lines are obtained.

Figure 18:
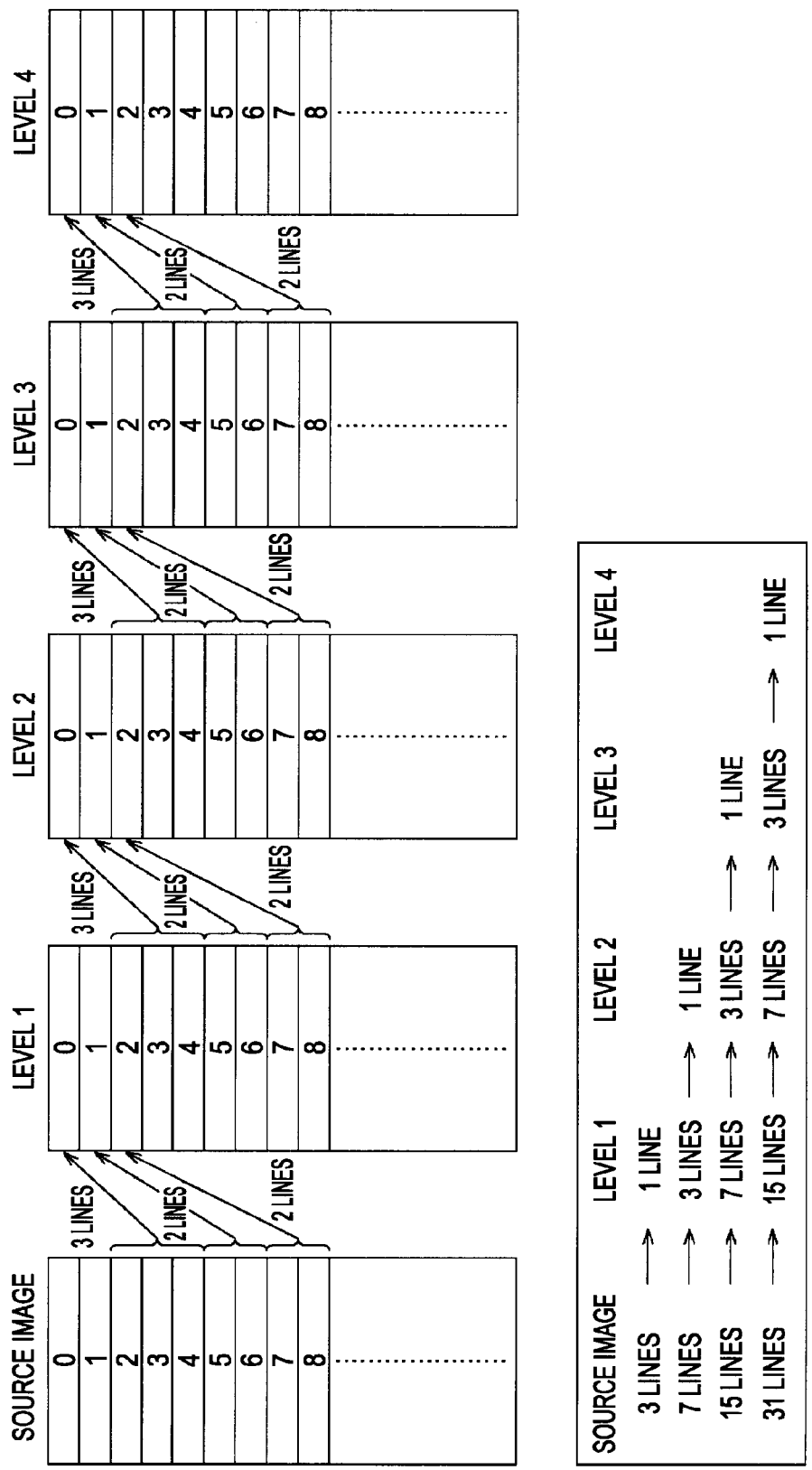
FIG. 18 is a schematic diagram illustrating an exemplary process of analysis filtering.

Furthermore, when dividing at division level 2 or higher using the 5×3 filter as described above, the scheduler 111 controls both the horizontal analysis filter unit 112 and the vertical analysis filter unit 114 to repeatedly execute analysis filtering two or more times as shown in FIG. 18.

In other words, the wavelet transformer 100 generates coefficients of one line at division level 1 when an original image (source image) of three lines is input under the control of the scheduler 111.

The process is repeatedly performed under each of the unsteady state and the steady state to generate coefficients of three lines from the original image of seven lines at division level 1. Then, the wavelet transformer 100 generates coefficients of one line at division level 2 from the coefficients of three lines at division level 1.

Similarly, the process under each of the above states is repeatedly executed, thereby generating coefficients of seven lines at division level 1 from the original image of 15 lines. Furthermore, coefficients of three lines at division level 2 from the coefficients of seven lines at division level 1. Then, the wavelet transformer 100 generates coefficients of one line at division level 3 from the coefficients of three lines at division level 1.

Similarly, the process under each of the above states is repeatedly executed, thereby generating coefficients of 15 lines at division level 1 from the original image of 31 lines. Furthermore, coefficients of seven lines at division level 2 are generated from the coefficients of 15 lines at division level 1. Furthermore, coefficients of three lines at division level 3 are generated from the coefficients of seven lines at division level 1. Then, the wavelet transformer 100 generates coefficients of one line at division level 4 from the coefficients of three lines at division level 3.

In this way, the scheduler 111 repeats such control and then performs analysis filtering on all the lines of a picture. By controlling in this way, the scheduler 111 can reduce the amount of memory used in a wavelet conversion process.

3. Third Embodiment

[Exemplary Configuration of Encoder]

The wavelet transformer 100 shown in FIG. 1 may be constructed as a processing part and may be combined with any of other processing unit to form another apparatus. For example, it may be designed as an encoder.

Figure 19:
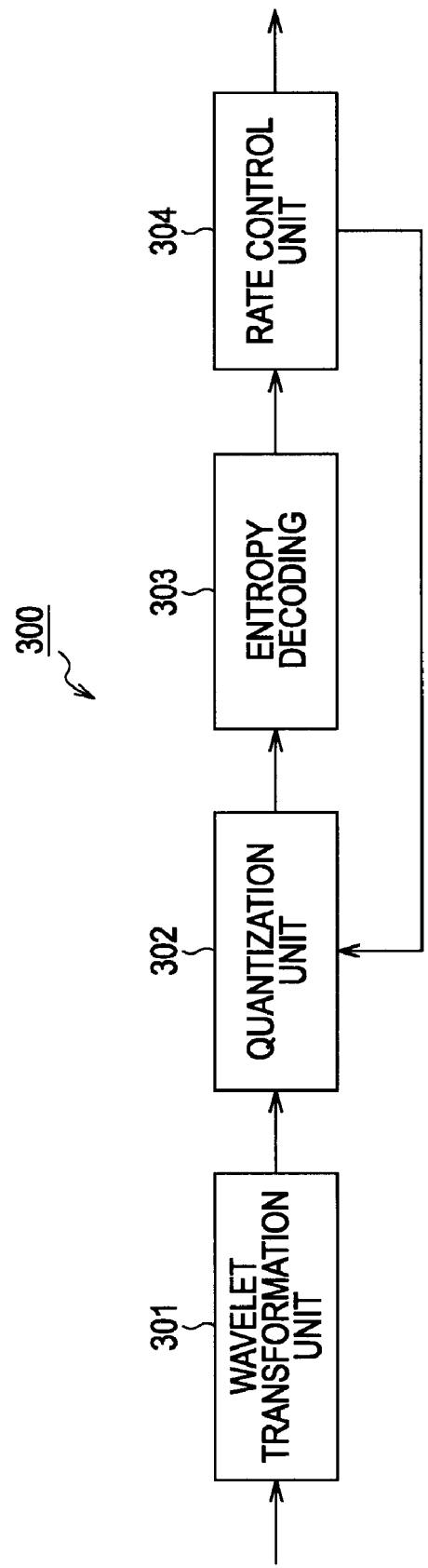
FIG. 19 is a block diagram illustrating an exemplary main configuration of an encoding apparatus according to an embodiment of the present invention.

FIG. 19 is a block diagram illustrating an exemplary configuration of an encoding apparatus using a wavelet transformer 100 shown in FIG. 1 as a processing unit according to an embodiment of the present invention. In FIG. 19, an encoding apparatus 300 is designed to encode an input image signal. The encoding apparatus 300 includes a wavelet transform unit 301, a quantization unit 302, an entropy encoding unit 303, and a rate control unit 304.

The wavelet transform unit 301 has the same principal configuration as that of the wavelet transformer 100 of FIG. 1. The wavelet transform unit 301 includes a scheduler 111 that controls both a horizontal analysis filter unit 112 and a vertical analysis filter unit 114 to execute analysis filtering at a predetermined interval.

Specifically, at this time, the scheduler 111 divides a state into an unsteady state and a steady state and then executes analysis filtering at a suitable interval for each state to reduce memory usage. The wavelet transform unit 301 repeats the analysis filtering under such control until it reaches a predetermined division level, followed by supplying coefficient data after the analysis to the quantization unit 302.

In the quantization unit 302, quantizes the coefficients of the respective components generated by the wavelet converter 301 by dividing by a quantization step size for example, thereby generating quantized coefficients.

At this time, the quantization unit 302 can set up a quantization step size for each line block. Here, the line block includes coefficients of all the frequency components in a certain image region (in FIG. 4, ten frequency components, from 3LL to 1HH). Thus, performing quantization for each line block enables the feature of wavelet transformation, which is the advantage of multiple resolution analysis, to be utilized. Also, only the number of line blocks has to be determined for the entire screen, reducing the load on the encoding apparatus 300.

Further, the energies of image signals are generally concentrated at the low-pass components. In addition, deterioration in low-pass components tends to be more conspicuous to human visual perception. Therefore, quantization can be advantageously weighted such that the quantization step sizes of low-pass component sub-bands are ultimately smaller. This weighting appropriates a relatively greater amount of information to the low-pass comments, consequently improving the overall impression of image quality.

The entropy encoding unit 303 performs an information-encoding process on the quantized coefficients generated at the quantization unit 302, thereby generating compressed encoded code stream. As for the information-encoding process, Huffman coding used with JPEG or MPEG (Moving Picture Experts Group), or even higher-efficiency arithmetic coding used with JPEG 2000, can be used.

Now, coefficients of which range to apply the entropy encoding to is an extremely important issue, directly related to compression efficiency. With the JPEG and MPEG methods for example, DCT (Discrete Cosine Transform) is performed on blocks of 8×8, and Huffman encoding is performed on the generated 64 DCT coefficients, thereby compressing the information. In other words, the 64 DCT coefficients is the range of entropy encoding.

With the wavelet transformation unit 301, wavelet transformation is performed in increments of lines, unlike DCT which is performed on blocks of 8×8, so at the entropy encoding unit 303, source coding is performed independently for each frequency band, and for each P line within each frequency band.

One line is the minimum for P, but the fewer number of lines, the less reference information is used, meaning that the memory capacity can be reduced that much. Conversely, the more lines there are, the more information amount there is accordingly, so encoding efficiency can be improved.

However, in the event that P exceeds the number of lines of the line block within the frequency bands, this will use lines of the next line block. Accordingly, the processing has to wait for quantization coefficient data for this line block to be generated by wavelet transformation and quantization, and this wait time will become delay time.

Accordingly, if reducing delay time is desired, it is necessary for P to be kept within the number of lines of the line block. For example, in the case shown in FIG. 4, for the frequency bands of 3LL, 3HL, 3LH, and 3LL, the number of lines of the line blocks is 1, so P=1. Also, for the sub-bands of 2HL, 2LH, and 2HH, the number of lines of the line blocks is 2, so P=1 or 2.

The rate control unit 304 performs control for ultimately matching the target bit rate or compression rate, and externally outputs the post-rate-control encoded code stream. For example, the rate control unit 304 transmits control signals to the quantization unit 302 so as to reduce the quantization step size in the event of raising the bit rate, and increase the quantization step size in the event of lowering the bit rate.

As described above, the wavelet transform unit 301 can reduce the memory usage of a wavelet transform process. Thus, the encoding apparatus 300 can reduce the capacity of memory used for an encoding process. As a result, costs can be reduced.

Such an encoding apparatus 300 can be applied to an apparatus or system, for example, that compresses, transmits, receives, or elongates image signals, video signals, images, or the like, thereby outputting an image.

Specifically, for example, the encoding apparatus 300 can be applied to any of mobile communication tools, cameras equipped with video recording functions, and digital cameras. For example, furthermore, the encoding apparatus can be applied to any of TV conference systems, security camera recording systems, telemedical diagnosis systems, broadcasting video compression/transmission systems, and distribution systems for live images.

Another application is applicable to, for example, an interactive communication between students and teachers and wireless image transmission. For example, it is also applicable to interactive game applications.

The series of processing in these various applications can be realized by hardware or by software. In this case, for example, the hardware or the software may be built in or installed in a personal computer as shown in FIG. 20.

Figure 20:
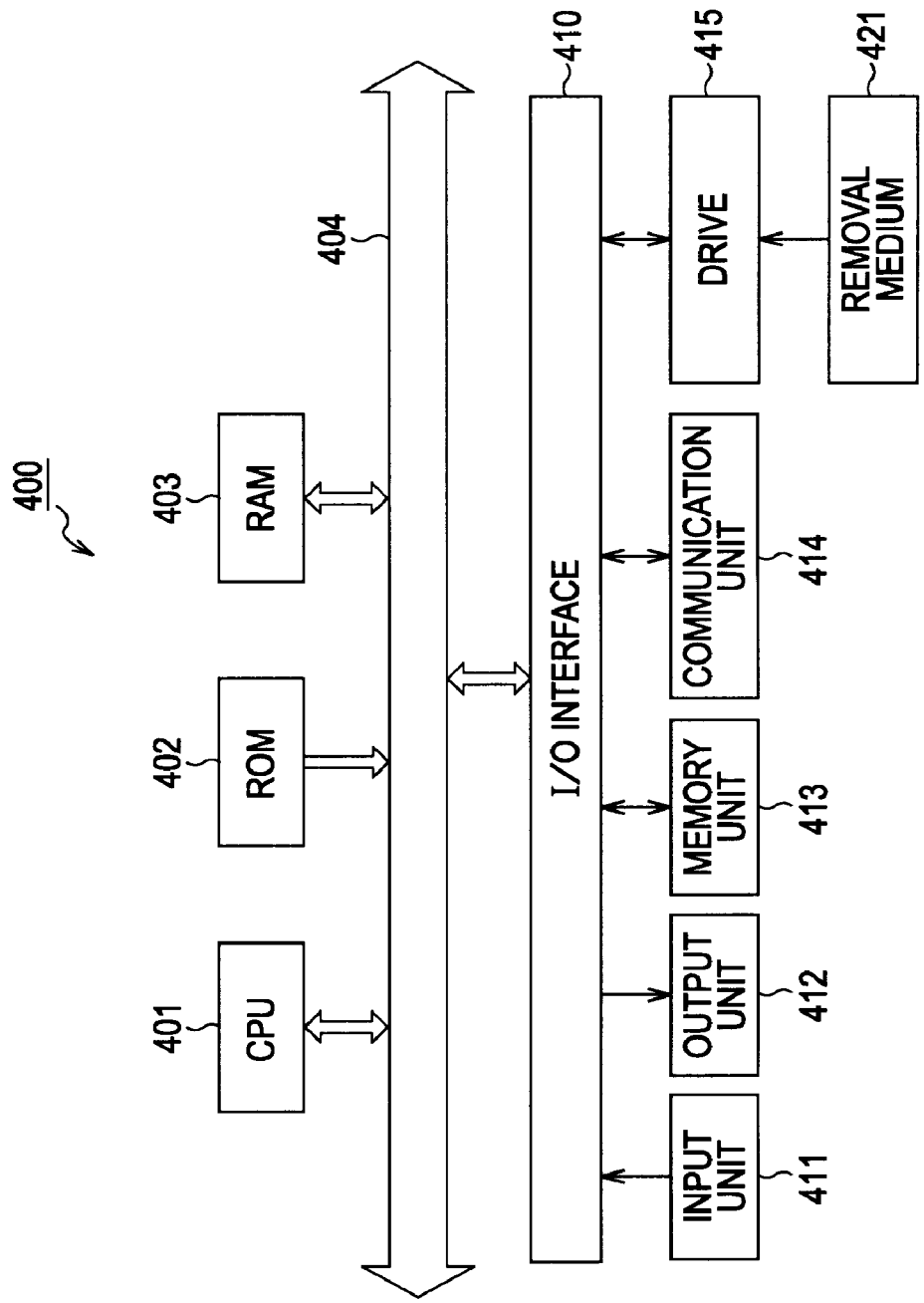
FIG. 20 is a block diagram illustrating an exemplary main configuration of a personal computer according to an embodiment of the present invention.

In FIG. 20, the CPU (Central Processing Unit) 401 of a personal computer 400 executes a various kind of processing according to programs stored in ROM (Read Only Memory) 402 or programs loaded from a storage unit 413 into RAM (Random Access Memory) 403. The RAM 403 suitably stores data or the like used by the CPU 401 to execute various kinds of processing.

The CPU 401, ROM 402, and RAM 403 are mutually connected by a bus 404. The bus 404 is also connected to an input/output (I/O) interface 410.

The I/O interface 410 is connected to an input unit 411 including a keyboard, a mouse, and so on. In addition, the I/O interface 410 is also connected to an output unit 412 including a display, a speaker, and so on. The display may be a CRT (Cathode Ray Tube), a LCD (Liquid Crystal Display), an organic EL display (Organic Electro Luminescence Display), or the like.

Furthermore, the I/O interface 410 is connected to a storage unit 413 including a hard disk or a SSD (Solid State Drive). Furthermore, the I/O interface 410 is connected to a communication unit 414.

The communication unit 414 may include, for example, a modem, a LAN (Local Area Network) interface, or a USB (Universal Serial Bus) interface. In addition, the communication unit 414 may include, for example, IEEE (Institute of Electrical and Electronic Engineers) 1394 interface. Furthermore, the communication unit 414 may include, for example, the Bluetooth interface or a wireless LAN interface. The communication unit 414 performs communication processing through a network including the Internet.

The I/O interface 410 may be connected to a drive 415 if necessary. The drive 415 may be suitably equipped with a removable medium 421, such as a magnetic disc, an optical disc, a magneto-optical disc, or a semiconductor memory device. A computer program read out from the removable medium 421 may be installed in the storage unit 413 if necessary.

To execute the above series of processing by software, any of programs of such software may be installed from a network or a recording medium.

As shown in FIG. 20, for example, the recording medium may be a removable medium 421, which is independent from the main body of the personal computer, provided for distributing a program to users.

The removable medium 421 may be, for example, a magnetic disc (e.g., a flexible disc) in which a program is recorded. Alternatively, the removable medium 421 may be, for example, an optical disc (CD-ROM (Compact Disc-Read Only memory) or DVD (Digital Versatile Disc).

The removable medium 421 may be, for example, a magneto-optical disc (MD (Mini Disc)). Furthermore, the removable medium 421 may be, for example, semiconductor memory.

The recording medium may be any device other than the removable medium 421. For example, it may be a ROM 402 that stores a program to be distributed to a user while being pre-installed in the main body of any apparatus. Alternatively, it may be a hard disc incorporated in the storage unit 413.

Note that it goes without saying that the steps describing the program recorded in the recording medium with the present specification include a time-series arrangement in the order described, but is not limited to a time-series form, and processing executed in parallel or individually also is included.

Also, according to the present specification, the term "system" indicates the entirety of equipment or apparatus configured of multiple devices.

Note that with the above-described, a configuration described as one device (or processing unit) may be divided and configured as multiple devices (or processing units). Alternatively, a configuration described above as multiple devices (or processing units) may be configured together as one device (or processing unit). Also, any configuration other than the configurations of the respective devices (or the respective processing units) described above may be applied to any of those described above. Further, if the configuration and operation as an entire system are practically the same, a portion of the configuration of a certain device (or processing unit) may be included in the configuration of another device (or processing unit). That is to say, the embodiments of the present invention are not limited to the above-described, and various modifications may be made within the scope of the spirit of the present invention.

The present application contains subject matter related to that disclosed in Japanese Priority Patent Application JP 2008-310731 filed in the Japan Patent Office on Dec. 5, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for performing a wavelet transformation on an image signal, comprising:
    means for horizontal analysis filtering, where horizontal analysis filtering is performed to divide frequency components of said image signal into a low-pass component and a high-pass component in the horizontal direction;
    means for vertical analysis filtering, where vertical analysis filtering is performed to divide each of said low-pass component and said high-pass component divided by said horizontal analysis filtering in said means for performing horizontal analysis filtering into a low-pass component and a high-pass component in the vertical direction;
    means for horizontal control performing horizontal control for performing said horizontal analysis filtering on said frequency components of a first information volume when it is in an unsteady state where a first arithmetic coefficient which is a coefficient available for horizontal analysis filtering is not present, and performing said horizontal analysis filtering on said frequency components of a second information volume using said first arithmetic coefficient when it is in a steady state where said first arithmetic coefficient is present;
    means for first control for allowing said means for horizontal control to repetitively perform said horizontal control until said horizontal analysis filtering is performed on all of columns of a processing object line;
    means for vertical control performing vertical control for performing said vertical analysis filtering on said low-pass component and said high-pass component of a third information volume when it is in an unsteady state where a second arithmetic coefficient which is a coefficient available for vertical analysis filtering is not present, and performing said vertical analysis on said low-pass component and said high-pass component on a fourth information volume using said second arithmetic coefficient when it is in a steady state where said second arithmetic coefficient is present; and
    means for second control for allowing said means for vertical control to repetitively perform said vertical control until said vertical analysis filtering is performed on all of lines.

2. The information processing apparatus according to claim 1, wherein
    said means for horizontal control performs symmetrical extension of a column which is the second from the left of an image to add a sample which is the leftmost of said image.

3. The information processing apparatus according to claim 1, wherein
    when it is in said steady state said means for vertical control performs symmetrical extension of a sample on a line which is the second from the top of said image to add a sample which is the topmost of said image.

4. The information processing apparatus according to claim 1, wherein
    said means for horizontal analysis filtering performs said horizontal analysis filtering by lifting calculation using a predetermined filter.

5. The information processing apparatus according to claim 4, wherein
    said means for horizontal analysis filtering latches some of coefficients obtained by said lifting calculation as said first arithmetic coefficient, and
    said means for horizontal control determines whether it is in said unsteady state or said steady stage depending on whether said first arithmetic coefficient is latched and performs said horizontal control.

6. The information processing apparatus according to claim 1, wherein
    said means for vertical analysis filtering performs said vertical analysis filtering by lifting calculation using a predetermined filter.

7. The information processing apparatus according to claim 6, further comprising:
    means for holding in which some of coefficients obtained by said lifting calculation in said vertical analysis filtering are held, wherein
    said means for vertical analysis filtering allows said means for holding to hold some of said coefficients obtained by said lifting calculation as second arithmetic coefficient; and
    said means for vertical control determines whether it is in said unsteady state or said steady stage depending on whether said second arithmetic coefficient is held in said means for holding and performs said vertical control.

8. The information processing apparatus according to claim 1, wherein
    said first information volume is five columns and said second information volume is two columns.

9. The information processing apparatus according to claim 1, wherein
    said third information volume is five columns and said fourth information volume is two columns.

10. The information processing apparatus according to claim 1, wherein
    said first information volume is three columns and said second information volume is two columns.

11. The information processing apparatus according to claim 1, wherein
said third information volume is three columns and said fourth information volume is two columns.

12. An information processing method used in an information processing apparatus for performing a wavelet transform on an image signal, wherein
said information processing apparatus includes:
means for horizontal analysis filtering, where horizontal analysis filtering is performed to divide frequency components of said image signal into a low-pass component and a high-pass component in the horizontal direction; and
means for vertical analysis filtering, where vertical analysis filtering is performed to divide each of said low-pass component and said high-pass component divided by said horizontal analysis filtering in said means for performing horizontal analysis filtering into a low-pass component and a high-pass component in the vertical direction, and
the method comprising steps of:
allowing said means for horizontal control to perform said horizontal analysis filtering on said frequency components of said first information volume when said means for horizontal means is in an unsteady state where a first arithmetic coefficient which is a coefficient available for horizontal analysis filtering is not present, and allowing said means for horizontal control to perform said horizontal analysis filtering on said frequency components of said second information volume using said first arithmetic coefficient when said means for horizontal means is in a steady state where said first arithmetic coefficient is present;
allowing means for first control to allow said means for horizontal control to repetitively perform said horizontal control until said horizontal analysis filtering is performed on all of columns of a processing object line;
allowing said means for vertical control to perform said vertical analysis filtering on said low-pass component and said high-pass component of a third information volume when said means for vertical control is in an unsteady state where a second arithmetic coefficient which is a coefficient available for vertical analysis filtering is not present, and allowing said means for vertical control to perform said vertical analysis filtering on said low-pass component and said high-pass component of said fourth information volume using said second arithmetic coefficient when said means for vertical control is in a steady state where said second arithmetic coefficient is present; and
allowing means for second control to allow said means for vertical control to repetitively perform said vertical control until said vertical analysis filtering is performed on all of lines.

13. An information processing apparatus for performing a wavelet transformation on an image signal, comprising:
a device configured to perform horizontal analysis filtering, where horizontal analysis filtering is performed to divide frequency components of said image signal into a low-pass component and a high-pass component in the horizontal direction;
a device configured to perform vertical analysis filtering, where vertical analysis filtering is performed to divide each of said low-pass component and said high-pass component divided by said horizontal analysis filtering in said device configured to perform horizontal analysis filtering into a low-pass component and a high-pass component in the vertical direction;
a device configured to perform horizontal control, performing horizontal control for performing said horizontal analysis filtering on said frequency components of a first information volume when it is in an unsteady state where a first arithmetic coefficient which is a coefficient available for horizontal analysis filtering is not present, and performing said horizontal analysis filtering on said frequency components of a second information volume using said first arithmetic coefficient when it is in a steady state where said first arithmetic coefficient is present;
a device configured to perform first control for allowing said device configured to perform horizontal control to repetitively perform said horizontal control until said horizontal analysis filtering is performed on all of columns of a processing object line;
a device configured to perform vertical control performing vertical control for performing said vertical analysis filtering on said low-pass component and said high-pass component of a third information volume when it is in an unsteady state where a second arithmetic coefficient which is a coefficient available for vertical analysis filtering is not present, and performing said vertical analysis on said low-pass component and said high-pass component on a fourth information volume using said second arithmetic coefficient when it is in a steady state where said second arithmetic coefficient is present; and
a device configured to perform second control for allowing said device configured to perform vertical control to repetitively perform said vertical control until said vertical analysis filtering is performed on all of lines.

* * * * *